(12) United States Patent
Greene et al.

(10) Patent No.: US 10,484,111 B2
(45) Date of Patent: Nov. 19, 2019

(54) METHODS, SYSTEMS, AND APPARATUS FOR AUTOMATIC RF POWER TRANSMISSION AND SINGLE ANTENNA ENERGY HARVESTING

(71) Applicant: Powercast Corporation, Pittsburgh, PA (US)

(72) Inventors: Charles E. Greene, Cabot, PA (US); Eric J. Biel, Pittsburgh, PA (US)

(73) Assignee: Powercast Corporation, Pittsburgh, PA (US)

(*) Notice: Subject to any disclaimer, the term of this patent is extended or adjusted under 35 U.S.C. 154(b) by 0 days.

(21) Appl. No.: 16/121,275

(22) Filed: Sep. 4, 2018

(65) Prior Publication Data
US 2019/0074915 A1    Mar. 7, 2019

Related U.S. Application Data

(60) Provisional application No. 62/553,628, filed on Sep. 1, 2017.

(51) Int. Cl.
*H04B 17/23* (2015.01)
*H04B 17/10* (2015.01)
(Continued)

(52) U.S. Cl.
CPC ............. *H04B 17/23* (2015.01); *G01S 5/14* (2013.01); *H04B 17/102* (2015.01);
(Continued)

(58) Field of Classification Search
CPC .... H04B 17/23; H04B 17/102; H04B 17/318; H04W 52/28; H04W 52/245; H04W 76/28; H04W 52/288; H04W 52/283; G01S 5/14
See application file for complete search history.

(56) References Cited

U.S. PATENT DOCUMENTS 9,107,579 B2 *  8/2015  Greene ............... A61B 5/0024
9,706,924 B2 *  7/2017  Greene ............... A61B 5/0024
(Continued)

FOREIGN PATENT DOCUMENTS

WO   WO 2019/046855   3/2019
WO   WO 2019/113127   6/2019

OTHER PUBLICATIONS

International Search Report and Written Opinion dated Nov. 29, 2018, for PCT/US2018/049392, 17 pages.

*Primary Examiner* — Brandon J Miller
(74) *Attorney, Agent, or Firm* — Cooley LLP

(57) ABSTRACT

In some embodiments, a transmitter has a first mode and a second mode. The transmitter is configured to repeatedly send discrete first wireless signals carrying transmitter identification information uniquely associated with the transmitter in the first mode and to send a second wireless signal carrying the transmitter identification information in the second mode. A receiver is configured to receive a wireless signal of the first wireless signals such that the receiver is activated by the wireless signal of the first wireless signal and, in response to receiving the wireless signal of the first wireless signals, to send a third wireless signal carrying the transmitter identification information to the transmitter. The transmitter is configured to transition from the first mode to the second mode in response to receiving the third wireless signal and determining that the third wireless signal includes the transmitter identification information uniquely associated with the transmitter.

21 Claims, 13 Drawing Sheets

(51) Int. Cl.

| | |
|---|---|
| *H04B 17/318* | (2015.01) |
| *H04W 76/28* | (2018.01) |
| *G01S 5/14* | (2006.01) |
| *H04W 52/24* | (2009.01) |
| *H04W 52/28* | (2009.01) |

(52) U.S. Cl.
CPC ........ *H04B 17/318* (2015.01); *H04W 52/245* (2013.01); *H04W 52/28* (2013.01); *H04W 76/28* (2018.02); *H04W 52/283* (2013.01); *H04W 52/288* (2013.01)

(56) References Cited

U.S. PATENT DOCUMENTS

| | | |
|---|---|---|
| 2009/0168677 A1 | 7/2009 | Kang et al. |
| 2013/0154387 A1 | 6/2013 | Lee et al. |
| 2014/0015478 A1 | 1/2014 | Von Novak |
| 2015/0097442 A1 | 4/2015 | Muurinen |
| 2015/0270740 A1* | 9/2015 | Lee ................. H04B 5/0037 320/108 |
| 2015/0326025 A1 | 11/2015 | Bell et al. |
| 2016/0087486 A1* | 3/2016 | Pogorelik ............. H02J 7/025 320/108 |
| 2016/0087691 A1 | 3/2016 | Van Wageningen et al. |
| 2017/0229925 A1* | 8/2017 | Shirani-Mehr ......... H02J 50/80 |
| 2019/0181674 A1 | 6/2019 | Greene et al. |

\* cited by examiner

METHODS, SYSTEMS, AND APPARATUS FOR AUTOMATIC RF POWER TRANSMISSION AND SINGLE ANTENNA ENERGY HARVESTING

CROSS-REFERENCE TO RELATED APPLICATIONS

This application claims priority to U.S. Provisional Application No. 62/553,628, entitled "Methods, Systems, and Apparatus for Automatic RF Power Transmission and Single Antenna Energy Harvesting," filed Sep. 1, 2017, the disclosure of which is incorporated by reference herein in its entirety.

BACKGROUND

Some embodiments described herein relate generally to systems, methods, and apparatus for wirelessly transmitting power.

As processor capabilities have expanded and power requirements have decreased, the number of devices operating independent of wires or power cords has increased. These "untethered" devices (also referred to as "wireless devices") include, for example, cell phones, wireless headphones, wireless keyboards, smartwatches, building sensors, and RFID tags. These untethered devices, however, are often limited by their portable power sources (e.g., the life and/or capacity of their batteries). Furthermore, recharging the portable power sources of many untethered devices often requires the untethered devices to be temporarily coupled via a wire (e.g., a power cord) to an external power source, such as a wall outlet. Thus, during a recharging period, the untethered devices have limited mobility relative to the external power source. Additionally, a user of an untethered device typically needs to manually initiate and conclude a recharging process of the untethered device, which may be inconvenient.

Thus, a need exists for systems, methods, and apparatus that allow for convenient wireless powering of wireless devices.

SUMMARY

In some embodiments, a system includes a transmitter and a receiver. The transmitter has a first mode and a second mode. The transmitter configured to repeatedly send a number of discrete first wireless signals in the first mode, each wireless signal of the first wireless signals having a power level and carrying transmitter identification information uniquely associated with the transmitter. The transmitter configured, when in the second mode, to send a second wireless signal having a power level and carrying the transmitter identification information. The receiver configured to receive a wireless signal of the first wireless signals such that the receiver is activated by the wireless signal of the first wireless signal. The receiver configured, in response to receiving the wireless signal of the first wireless signals, to send a third wireless signal carrying the transmitter identification information to the transmitter. The transmitter configured to transition from the first mode to the second mode in response to receiving the third wireless signal and determining that the third wireless signal includes the transmitter identification information uniquely associated with the transmitter.

DETAILED DESCRIPTION

Figure 1A:
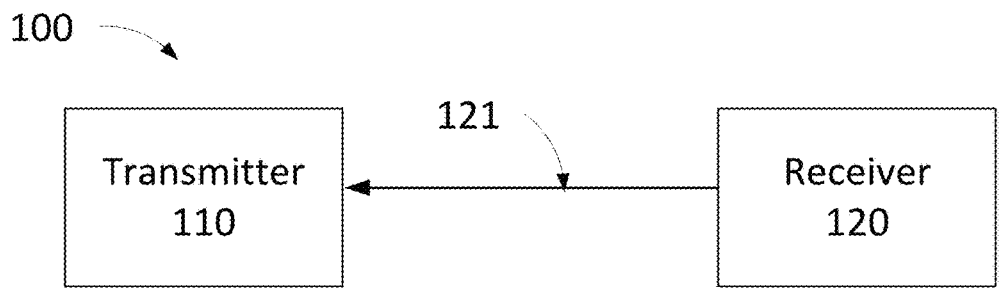
FIGS. 1A-1G are schematic illustrations of a system for wirelessly transferring power, according to an embodiment, in various stages of operation.

In some embodiments, a system includes a transmitter and a receiver. The transmitter has a first mode and a second mode. The transmitter is configured to repeatedly send a number of discrete first wireless signals in the first mode, each wireless signal of the first wireless signals having a power level and carrying transmitter identification information uniquely associated with the transmitter. The transmitter is configured, when in the second mode, to send a second wireless signal having a power level and carrying the transmitter identification information. The receiver is configured to receive a wireless signal of the first wireless signals such that the receiver is activated by the wireless signal of the first wireless signal. The receiver is configured, in response to receiving the wireless signal of the first wireless signals, to send a third wireless signal carrying the transmitter identification information to the transmitter. The transmitter is configured to transition from the first mode to the second mode in response to receiving the third wireless signal and determining that the third wireless signal includes the transmitter identification information uniquely associated with the transmitter.

In some embodiments, a system includes a receiver and a transmitter. The receiver is configured to send a first wireless signal to a transmitter. The first wireless signal includes a request for power. The receiver is configured, upon receiving a second signal including transmitter identification information, to send a third wireless signal including the transmitter identification information. The transmitter is configured to activate in response to receiving the first wireless signal such that the transmitter sends a second wireless signal having a power level and carrying transmitter identification information uniquely associated with the transmitter. The transmitter is configured to send the second wireless signal until a predetermined time duration of a timeout timer of the transmitter elapses. The timeout timer is configured to start when the transmitter receives the first wireless signal. The timeout timer is configured to restart upon the transmitter receiving the third wireless signal carrying the transmitter identification information.

In some embodiments, an apparatus includes an antenna and a transmitter. The transmitter coupled to the antenna. The transmitter is configured to activate and send a second wireless signal via the antenna in response to receiving a first wireless signal. The second wireless signal has a power level and carry transmitter identification information uniquely associated with the transmitter. The first wireless signal includes a request for power. The transmitter is configured to send the second wireless signal until a predetermined time duration of a timeout timer of the transmitter elapses. The timeout timer is configured to start when the transmitter receives the first wireless signal. The timeout timer configured to restart in response to the transmitter receiving a third wireless signal carrying the transmitter identification information.

In some embodiments, an apparatus includes an antenna and a receiver. The receiver may be coupled to the antenna. The receiver may be configured to send a first wireless signal to a transmitter via the antenna. The first wireless signal may include a request for power. The receiver may be configured, in response to receiving a second wireless signal including transmitter identification information from the transmitter, to send a third wireless signal including the transmitter identification information via the antenna.

In some embodiments, a method includes sending, by a receiver at a first time, a first wireless signal including a request for power. The first wireless signal is received by a transmitter. At a second time after the first time, the transmitter sends a second wireless signal having a power level and carrying transmitter identification information. The transmitter continues to send the second wireless signal until a timeout timer of the transmitter reaches a predetermined time threshold. The second wireless signal is received by the receiver such that at least one of the receiver is powered by the second wireless signal or an energy storage level of an energy storage device coupled to the receiver is increased. At a third time after the second time, the receiver sends, in response to receiving the second wireless signal from the transmitter, a third wireless signal including the transmitter identification information repetitively. The timeout timer of the transmitter resets upon receiving the third wireless signal.

In some embodiments, a system may include a transmitter and one or more receivers. The transmitter may be configured to send wireless power to the one or more receives such that energy storage devices associated with the one or more receivers may be charged (e.g., partially or fully recharged). In some embodiments, the transmitter may be able to send wireless power over a particular range or distance. Thus, the transmitter may have a range or zone (e.g., a three-dimensional area) over which the transmitter is configured to send wireless power to charge the energy storage devices associated with the one or more receivers. The range or zone may be independent of a location of a receiver. Each of the one or more receivers may have a particular range over which the one or more receivers may be configured to send wireless communications (e.g., beacons). The range over which the one or more receivers may be configured to send wireless communications may be greater than the range over which the transmitter may be able to send wireless power. Thus, in some embodiments, the system may be configured such that the transmitter will only initiate sending wireless power when at least one of the one or more receivers is within the zone or range of the transmitter and able to receive wireless power from the transmitter such that the transmitter may charge the energy storage device of the receiver. In some embodiments, the system may be configured such that the transmitter will only continue sending wireless power when at least one of the one or more receivers is within the zone or range of the transmitter and able to receive wireless power from the transmitter such that the transmitter may charge the energy storage device of the receiver. Furthermore, the system may include two or more transmitters. The transmitters may be disposed within a space, such as the same room or different rooms of the same building (e.g., house). The system may be configured such that, even if two or more of the transmitters receive a wireless communication from a receiver (e.g., requesting wireless power), only the transmitter that is sufficiently close to the receiver to transmit wireless power to the receiver will be activated and/or will continue sending wireless power to the receiver after an initial period. The system may also be configured such that, if the receiver is moved away from a first transmitter and toward a second transmitter, the receiver may activate the second transmitter and stop receiving powering energy (e.g., charging energy) from the first transmitter such that the receiver continues to receive powering energy in series with no or only a brief interruption in wireless power delivery.

In some embodiments, a system includes a transmitter and a receiver. The receiver may be configured to request power to be transmitted via wireless communication (e.g., via sending a beacon). The transmitter may receive the request from the receiver and, in response to receiving the request, transition from an initial state (i.e., an initial mode) in which the transmitter is not sending any signals to a first state (i.e., a first mode) in which the transmitter sends power and data to the receiver. The data may include transmitter identification information (e.g., a transmitter identification number) uniquely associated with the transmitter. When the transmitter sends power and data to the receiver in the first state, the transmitter may initiate a first timeout timer, setting a first time duration (e.g., 3-5 seconds) within which the transmitter must receive a wireless communication (e.g., a request for power) including the transmitter identification information uniquely associated with the transmitter, or else the transmitter will return to the initial state. Thus, if the transmitter does not receive a wireless communication including the transmitter identification information uniquely associated with the transmitter within the first time duration (e.g., before the first time duration elapses and the timeout timer runs to zero), the transmitter may return to the initial state. If the transmitter receives a wireless communication including the transmitter identification information uniquely associated with the transmitter within the first time duration, the transmitter may transition to a second state (i.e., a second mode) in which the transmitter sends power and data to the receiver to charge the receiver.

When the transmitter sends power and data to the receiver in the second state, the transmitter may initiate a second timeout timer, setting a second time duration (e.g., 1 minute) longer than the first time duration within which the transmitter must receive a wireless communication (e.g., a request for power) including the transmitter identification information uniquely associated with the transmitter, or else the transmitter will return to the initial state. Thus, if the transmitter does not receive a request for power including the transmitter identification information uniquely associated with the transmitter within the second time duration (e.g., before the second time duration elapses and the timeout time runs to zero), the transmitter may return to the initial state. If the transmitter receives a wireless communication including the transmitter identification information uniquely associated with the transmitter within the second time duration, the second timeout timer may reset. The timeout timer of the transmitter may be configured to reset every time the transmitter receives a wireless communication including the transmitter identification information uniquely associated with the transmitter such that the transmitter may continue sending power and data to the receiver for a period of time significantly longer than the second time duration (e.g., hours). Furthermore, the second timeout timer of the transmitter may be configured to reset regardless of the source of the wireless communication including the transmitter identification information. Thus, if the system includes a number of receivers, a wireless communication including the transmitter identification information uniquely associated with the transmitter from any of the receivers (i.e., fewer than all receivers) may reset the second timeout timer of the transmitter.

In some embodiments, a system includes a transmitter and a receiver. The transmitter may send (e.g., in a first mode or a ping mode) discrete pings of wireless power and data to a zone or area surrounding the transmitter. The pings may have a duration, for example, of about 200 ms to about 3 seconds. The pings may be sent, for example, every 5-30 seconds. The data may include transmitter identification information (e.g., a transmitter identification number) uniquely associated with the transmitter. If the receiver is located within the zone or area surrounding the transmitter such that the receiver is close enough to the transmitter to receive the wireless power, the receiver may receive the wireless power and the transmitter identification information uniquely associated with the transmitter and send a wireless communication (e.g., a beacon) including the transmitter identification information. If the transmitter does not receive a wireless communication including the transmitter identification information uniquely associated with the transmitter (e.g., because no receiver is within the zone or no receiver within the zone needs wireless power), the transmitter may continue to send the discrete pings. If the transmitter does receive a wireless communication including the transmitter identification information uniquely associated with the transmitter (e.g., because the receiver is in the zone), the transmitter may transition to a second mode (e.g., a powering and/or charge mode) in which the transmitter sends wireless power and the transmitter identification information uniquely associated with the transmitter to the zone or area surrounding the transmitter for a period of time longer than the length of a discrete ping.

For example, the transmitter may include a timeout timer such that, when the transmitter sends a wireless signal including power and data to the zone or area in the second mode, the transmitter may initiate the timeout timer, setting a time duration (e.g., 1 minute) within which the transmitter must receive a wireless communication (e.g., a request for power) including the transmitter identification information uniquely associated with the transmitter, or else the transmitter will return to the ping mode. In some embodiments, the wireless communication includes only the transmitter identification information uniquely associated with the transmitter from which the receiver received powering or charging energy. Thus, if the transmitter does not receive a request for power including the transmitter identification information uniquely associated with that transmitter within the time duration (e.g., before the time duration elapses and the timeout timer runs to zero), the transmitter may return to the initial state after the time duration elapses. If the transmitter receives a wireless communication including the transmitter identification information uniquely associated with that transmitter within the time duration (e.g., from the receiver in the zone), the timeout timer may reset. The timeout timer of the transmitter may be configured to reset every time the transmitter receives a wireless communication including the transmitter identification information uniquely associated with the transmitter such that the transmitter may continue sending power and data to the receiver for a period of time significantly longer than the time duration (e.g., hours). Furthermore, the timeout timer of the transmitter may be configured to reset regardless of the source as long as the wireless communication includes the transmitter identification information. Thus, if the system includes a number of receivers, a wireless communication including the transmitter identification information uniquely associated with the transmitter from any of the receivers (i.e., fewer than all receivers) may reset the timeout timer of the transmitter. For example, a first receiver may send an initial wireless communication to the transmitter such that the transmitter begins sending power and data to the zone and charges the first receiver, and a second receiver disposed in the zone may send a later wireless communication including the transmitter identification information uniquely associated with the transmitter such that the timeout timer of the transmitter resets.

FIGS. 1A-1G are schematic illustrations of a system 100 in various stages of operation. The system 100 may be the same or similar in structure and/or function to any of the systems described herein. As shown in FIG. 1A, the system 100 includes a transmitter 110 and a receiver 120. In some implementations, the transmitter 110 may include or be coupled to a first antenna and a second antenna, the first antenna configured to send wireless power and data via wireless signals and the second antenna configured to receive wireless communications via wireless signals. In some implementations, the first antenna and the second antenna of the transmitter 110 may be configured to operate sequentially and/or simultaneously and over the same or different frequencies. In some implementations, the transmitter 110 may include or be coupled to an antenna configured to both send wireless power and data via wireless signals and receive wireless communications via wireless signals. In some implementations, the receiver 120 may include or be coupled to a first antenna and a second antenna, the first antenna configured to receive wireless power and data via wireless signals and the second antenna configured to send wireless communications via wireless signals. In some implementations, the first antenna and the second antenna of the receiver 120 may be configured to operate sequentially and/or simultaneously and over the same or different frequencies. In some implementations, the receiver 120 may include or be coupled to an antenna configured to both receive wireless power and data via wireless signals and send wireless communications via wireless signals. In some implementations, none of the wireless signals sent by the transmitter 110 and/or the receiver 120 include any geographic location data.

The transmitter 110 may be configured to send wireless power via a pulsed signal and/or a continuous signal. The transmitter 110 may be configured to send a wireless signal including radio frequency (RF) energy. The transmitter 110 may transmit wireless power in the far-field. The power transmission may be via one or more antennas (as described above), and may be based on electromagnetic waves. In some implementations, the transmitter 110 may receive data from the receiver 120 via backscattered energy from an antenna of the receiver 120 that is received by an antenna of the transmitter 110.

The transmitter 110 may include any suitable components. For example, the transmitter 110 may include a processor and/or a memory. The transmitter 110 may include a power supply circuit, an electronic oscillator circuit, a modulator circuit, a radio frequency amplifier, and/or an impedance matching circuit. In some implementations, the transmitter 110 may be configured to receive power (e.g., via a cable) from a general-purpose alternating-current (AC) electric power supply (e.g., a wall electrical outlet).

The transmitter 110 may include any suitable components to communicate with another device (e.g., a computer and/or a server). For example, in some implementations, the transmitter 110 may include a wired communication port (e.g., a USB port) and/or a wireless communication component(s) (e.g., WiFi®). In some implementations, the transmitter 110 may receive commands from and/or be under the control of a wireless communication device, such as, for example, a smart phone or a tablet, using a protocol such as WiFi® or Bluetooth® Low Energy (BLE). Thus, the transmitter 110 may receiver commands enabling, disabling, or scheduling the transmission of wireless power.

The power transmitted by the transmitter 110 via wireless signals sent by the transmitter 110 (e.g., to the receiver 120) may be any suitable type of power. For example, the power can be in the form of a digital spread spectrum transmission such as a direct-sequence spread spectrum (DSSS) transmission. The wireless signals sent by the transmitter 110 may include data using any suitable amplitude modulation technique, such as, for example, amplitude-shift keying (ASK), frequency-shift keying (FSK), and/or phase-shift keying (PSK). In some implementations, the power can be transmitted at any suitable frequency, such as, for example, 868 MHz, 915 MHz, 2.4 GHz, and/or 5.8 GHz.

In implementations in which the wireless signals (e.g., power and data) sent between the transmitter and receiver are sent over the same frequency, the power can be sent via a spread spectrum method such as, for example, frequency-hopping spread spectrum (FHSS). In some implementations, the wireless signals sent between the transmitter and receiver may be sent over substantially the same frequency, as the frequency may vary slightly due to differences between the transmitter and the receiver (e.g., differences in electronics, temperatures, etc.) Data can be sent via any suitable method operating at the same frequency as the power transmission, such as, for example, backscatter from the receiver back to the transmitter.

The receiver 120 may be any suitable receiver device configured to receive wireless power and send wireless communication. The receiver 120 may be configured to send wireless communications via any suitable low power protocol such as, for example, Bluetooth® low energy (BLE). The receiver 120 may be associated with (e.g., include and/or be coupled to) an energy storage device such that wireless power received by the receiver 120 may be used to charge the energy storage device. The energy storage device may be any suitable type of energy storage device. In some implementations, the energy storage device may include a typical rechargeable chemical battery. In some implementations, the energy storage device may include a capacitor that can store energy. In some implementations, the receiver 120 may include or be coupled to a wireless device such as, for example, a video game controller or wireless headphones.

The receiver 120 may be configured to receive a wireless signal (e.g., the first wireless signal 121 shown in FIG. 1A) of the first wireless signals such that the receiver 120 is activated by the wireless signal of the first wireless signals.

For example, in some implementations, the receiver 120 may include an RF-powered wireless device. In some implementations, the receiver 120 may include a radio-frequency identification (RFID) tag. Thus, in some implementations, the receiver 120 may be activated such that the receiver 120 is operational in response to receiving wireless power from the transmitter 110. In some embodiments, the receiver 110 may be operational (e.g., drawing power from an energy storage device such as an on-board battery), but may be activated by a wireless signal sent by the transmitter 110 such that the receiver 120 may initiate a wireless communication operation (e.g., read the wireless signal and/or send a response wireless signal) or perform some other operation (e.g., perform an operation in response to receiving the wireless signal sent by the transmitter 110).

In some implementations, the transmitter 110 may, at a first time, read one or more passive RFID tags while, at a second time different from the first time, the transmitter 110 may read an RFID tag associated with an energy storage device (e.g., an active RFID tag) and power the energy storage device associated with the RFID tag. At a third time, the transmitter 110 may simultaneously read one or more passive RFID tags while reading and powering one or more active RFID tags. In some implementations, the transmitter 110 may periodically read a user memory of an RFID tag.

In some implementations, the transmitter 110 may be, for example, an ultra-high frequency (UHF) RFID reader. The receiver 120 may include a UHF RFID chip. The receiver 120 may also include an interface to other electronic devices through a communication port such as, for example, I2C or SPI. In some implementations, the UHF RFID chip may include a unique identifier, such as, for example, an EPC, that allows the transmitter to know that the receiver is a device enabled to accept wireless power (e.g., recharging energy). In some implementations, the RFID chip may contain user memory. The user memory may contain information about the state of the charge of the energy storage and/or the quality and/or quantity of the wireless charging. The information may include voltage level and/or whether the energy storage requires or does not require additional charging.

In some implementations, the transmitter 110 may be configured to send radio frequency identification (RFID) Electronic Product Code (EPC) and tag identification (TID) numbers to a server to track assets and supplies (e.g., people and goods).

As shown in FIG. 1A, the receiver 120 may send a first wireless signal 121 (e.g., a beacon or other wireless communication). For example, the receiver 120 may send the first wireless signal 121 when the energy level of the energy storage device associated with the receiver 120 has dropped below a threshold level. The first wireless signal 121 may include a request for wireless power. The first wireless signal 121 may include information about the energy storage device (e.g., information representing a stored power level or stored charge percentage of the energy storage device). As shown in FIG. 1A, the first wireless signal 121 may be received by the transmitter 110, which may be in an initial non-transmitting state prior to receiving the first wireless signal 121.

Optionally, the transmitter 110 may determine (e.g., calculate) the approximate distance between the transmitter 110 and the receiver 120. For example, the transmitter 110 may determine the approximate distance between the transmitter 110 and the receiver 120 based, at least in part, on a measurement of the received signal strength of the first wireless signal 121 (e.g., a received signal strength indicator (RSSI)). The transmitter 110 may determine whether the approximate distance between the transmitter 110 and the receiver 120 is below a threshold distance, and the transmitter 110 may only activate to send wireless power (e.g., via a second wireless signal 111 described below with reference to FIG. 1B) if the approximate distance is below a threshold distance. The threshold distance may be a distance corresponding to the range the transmitter 110 is configured to send wireless power, and the transmitter 110 therefor may be configured to not send wireless power to a requesting receiver 120 if the receiver 120 is too far from the transmitter 110 to receive the wireless power of the transmitter 110.

Figure 1B:
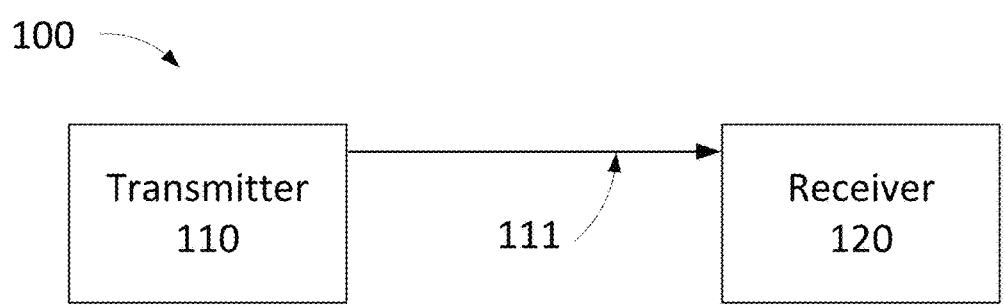

As shown in FIG. 1B, in response to receiving the first wireless signal 121 from the receiver 120, the transmitter 110 may send a second wireless signal 111. The second wireless signal 111 may have a power level and may carry transmitter identification information uniquely associated with the transmitter 110 (e.g., a transmitter identification number). The second wireless signal 111 may include any other suitable information, such as, for example, time data (e.g., system time and/or current world time). Thus, the second wireless signal 111 may be able to provide energy to a receiver such that an energy storage device associated with the receiver is charged. The second wireless signal 111 may include radio frequency (RF) energy. The second wireless signal 111 may have any suitable duration, such as, for example, a duration in the range of 200 ms to 3 s.

The transmitter 110 may include a first timeout timer. When the transmitter 110 sends the second wireless signal 111, the first timeout timer may be started. The first timeout timer may have any suitable predetermined time duration. For example, in some implementations, the first timeout timer may have a predetermined time duration of, for example, 3-5 seconds. In some implementations, the predetermined time duration can be any suitable duration longer than the duration of the second wireless signal 111. The predetermined time duration is a period of time within which the transmitter 110 must receive a wireless communication (e.g., a request for power) including the transmitter identification information uniquely associated with the transmitter 110, or else the transmitter 110 will return to an initial non-transmitting state. Thus, if the transmitter 110 does not receive a wireless signal including the transmitter identification information uniquely associated with the transmitter 110 within the first time duration (e.g., before the first time duration elapses and the first timeout timer runs to zero), the transmitter 110 may return to the initial state. If the transmitter 110 receives a wireless signal including the transmitter identification information uniquely associated with the transmitter 110 within the first time duration, the transmitter 110 may transition to a second state (i.e., a second mode) in which the transmitter 110 may send power and data to the receiver 120 to charge the receiver 120.

In some implementations, if the transmitter 110 returns to the initial state after the first time duration elapses and the receiver returns the transmitter identification information while the transmitter 110 is in the initial state, the transmitter 110 may be configured to transition to a second state (described below in reference to FIG. 1D) in which the transmitter 110 may send power and data (e.g., via a fourth wireless signal 113) to the receiver 120 to charge the receiver 120. In some implementations, if the transmitter 110 returns to the initial state after the first time duration elapses and the receiver returns the transmitter identification information while the transmitter 110 is in the initial state, the transmitter 110 may be configured to re-send the second wireless signal 111, restarting the first timeout timer, and wait for a response from the receiver 120 including the transmitter identification information within the first time duration.

Figure 1C:
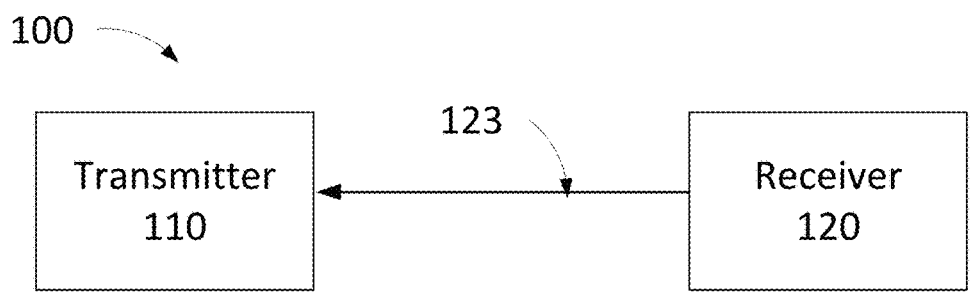

In some implementations, the first wireless signal 121 may include a requested timeout of the transmitter 110. For example, the receiver 120 may not have the energy storage capacity to send a wireless signal (e.g., the third wireless signal 123) often enough such that the transmitter 110 receives a wireless signal including transmitter identification information within the first time duration. Thus, the first wireless signal 121 may include a request that the first time timer of the transmitter 110 has a longer predetermined time duration than a default first time duration of the transmitter 110. The first wireless signal 121 may include a request or instruction for the first time duration to be a length at least two times or at least three times as long as the frequency that the receiver 120 may send wireless signals (e.g., the third wireless signal 123) such that the transmitter 110 will wait a sufficient length of time for the receiver 120 to respond to the second wireless signal 111 prior to transitioning back to an initial non-transmitting state. For example, in some implementations, the receiver 120 may be configured to send wireless signals (e.g., the first wireless signal 121 and/or the second wireless signal 123) at a frequency of every 10 seconds. The first wireless signal 121 may include an instruction that the first time duration be, for example, 30 seconds. As shown in FIG. 1B, if the receiver 120 is within the range of the second wireless signal 111 (e.g., within the zone or range that the transmitter 110 is configured to transmit wireless power), the second wireless signal 111 may be received by the receiver 120. The receiver 120, in response to receiving the second wireless signal 111, may identify (e.g., extract) the transmitter identification information from the second wireless signal 111. As shown in FIG. 1C, in response to receiving the second wireless signal 111, the receiver 120 may send a third wireless signal 123 (e.g., a beacon) including the transmitter identification information. The third wireless signal 123 may also include any other suitable communication and/or data, such as, for example, information representing a stored power level or stored charge percentage of the energy storage device.

Figure 1D:
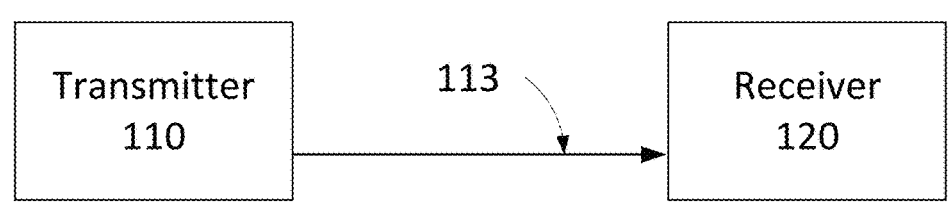

If the transmitter 110 receives the third wireless signal 123 within the first time duration such that the first timeout timer has not elapsed (e.g., reached zero), the transmitter 110 may transition to a second state (i.e., a second mode) in which the transmitter 110 may send power and data to the receiver 120 to charge the receiver 120. As shown in FIG. 1D, the transmitter 110 may send a fourth wireless signal 113. The fourth wireless signal 113 may have a power level and may carry the transmitter identification information uniquely associated with the transmitter 110. Thus, the fourth wireless signal 113 may be able to provide energy to a receiver such that an energy storage device associated with the receiver is charged. The fourth wireless signal 113 may include radio frequency (RF) energy. In some implementations, the fourth wireless signal 113 may have any suitable duration longer than the second wireless signal 111. In some implementations, the power level of the fourth wireless signal 113 may be more than the power level of the second wireless signal 111. For example, the transmitter 110 may send the fourth wireless signal 113 with a higher power level than the second wireless signal 111 after confirming that the receiver 120 is disposed within a coverage zone (i.e., an area within which the transmitter 110 can transmit wireless power) of the transmitter 110 (e.g., via receiving a wireless signal including the transmitter identification information uniquely associated with the transmitter 110). As another example, the transmitter 110 may send the fourth wireless signal 113 with a higher power level than the second wireless signal 111 based, at least in part, on an indication of the need for power or charging from the receiver 120 (e.g., via a wireless signal from the receiver 120).

The transmitter 110 may include a second timeout timer. The transmitter 110 may be configured to send the fourth wireless signal 113 until the second timeout timer of the transmitter 110 elapses. When the transmitter 110 sends the fourth wireless signal 113, the second timeout timer may be started. The second timeout timer may have any suitable second predetermined time duration. For example, in some implementations, the second timeout timer may have a second predetermined time duration of, for example, about one minute. In some implementations, the second predetermined time duration can be any suitable duration longer than the duration of the second wireless signal 111. The second predetermined time duration is a period of time within which the transmitter 110 must receive a wireless communication (e.g., a request for power) including the transmitter identification information uniquely associated with the transmitter 110, or else the transmitter 110 will return to the initial non-transmitting state. Thus, if the transmitter 110 does not receive a wireless signal including the transmitter identification information uniquely associated with the transmitter 110 within the second predetermined time duration (e.g., before the second time duration elapses and the second timeout timer runs to zero), the transmitter 110 may return to the initial state. If the transmitter 110 receives a wireless signal including the transmitter identification information uniquely associated with the transmitter 110 within the second predetermined time duration, the second timeout timer of the transmitter 110 may reset. The second timeout timer of the transmitter 110 may be configured to reset every time the transmitter 110 receives a wireless communication including the transmitter identification information uniquely associated with the transmitter 110 such that the transmitter 110 may continue sending power and data to the receiver 120 for a period of time significantly longer than the second predetermined time duration (e.g., hours). Furthermore, the second timeout timer of the transmitter 110 may be configured to reset regardless of the source of the wireless communication including the transmitter identification information. Thus, if the system 100 includes a number of receivers, a wireless communication including the transmitter identification information uniquely associated with the transmitter 110 from any of the receivers (i.e., fewer than all the receivers) may reset the second timeout timer of the transmitter 110.

Figure 1E:
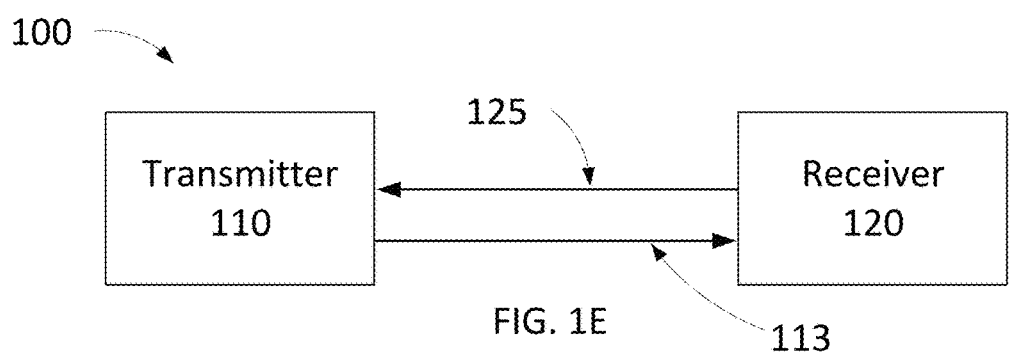

As shown in FIG. 1E, in response to the receiver 120 receiving the fourth wireless signal 113, and prior to the second timeout timer elapsing while the fourth wireless signal 113 is being sent by the transmitter 110, the receiver may send a fifth wireless signal 125. The fifth wireless signal 125 may include the transmitter identification information uniquely associated with the transmitter 110. The fifth wireless signal 125 may also include any other suitable communication and/or data. For example, the fifth wireless signal 125 may include a request for power (e.g., information representing a charging request of the energy storage source associated with the receiver 120). In some implementations, the fifth wireless signal 125 may be the same or similar to the third wireless signal 123. In some implementations, the fifth wireless signal 125 may be different from the third wireless signal 123. For example, the fifth wireless signal 125 may include updated information representing a charging request of the energy storage source associated with the receiver 120 compared to the third wireless signal 123.

Figure 1F:
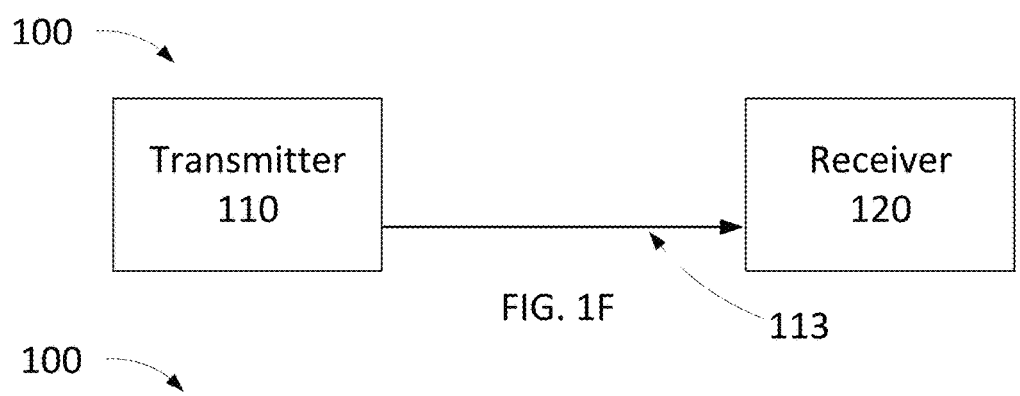

As shown in FIG. 1F, if the fifth wireless signal 125 is received by the transmitter 110 prior to the second timeout timer elapsing, the second timeout timer may restart because the transmitter 110 received a wireless communication including transmitter identification information uniquely associated with the transmitter 110 (i.e., the fifth wireless signal 125). Thus, the transmitter 110 may continue transmitting the fourth wireless signal 113 for a longer time period than if the transmitter 110 had not received the fifth wireless signal 125 or another wireless communication including transmitter identification information uniquely associated with the transmitter 110.

Although not shown, the transmitter 110 may continue sending the fourth wireless signal 113 indefinitely as long as the transmitter 110 continues to receive wireless communications including transmitter identification information uniquely associated with the transmitter 110. For example, the system 100 may repeatedly cycle between the steps described with respect to FIGS. 1E and 1F until sufficient wireless power has been delivered via the fourth wireless signal 113 to the receiver 120 to charge the energy storage device associated with receiver 120 above a threshold energy storage level. In some implementations, the receiver 120 may send wireless signals (e.g., beacons) similar to or the same as the fifth wireless signal 125 at periodic or varying time intervals while the receiver 120 is receiving the fourth wireless signal 113, confirming to the transmitter 110 that a receiver is still receiving the fourth wireless signal 113. In some implementations, the wireless signals sent by the receiver 120 while the receiver 120 is receiving the fourth wireless signal 113 may each reflect a current or updated status of the receiver 120, such as, for example, the energy storage level of the energy storage device associated with the receiver 120.

Figure 1G:
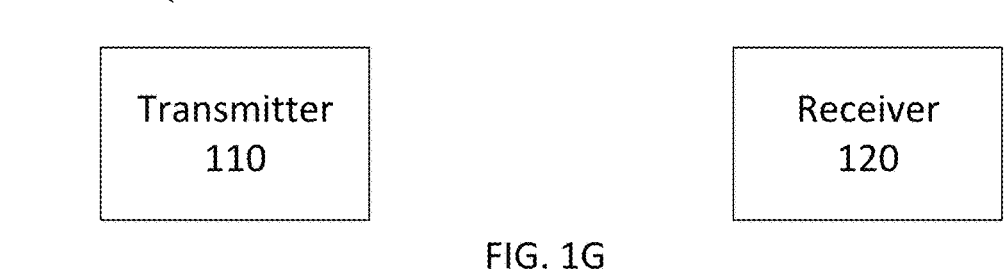

When the transmitter 110 does not receive a wireless communication including transmitter identification information uniquely associated with the transmitter 110 within the second predetermined time duration of the second timeout timer, the transmitter 110 may cease sending the fourth wireless signal 113, as shown in FIG. 1G, and transition back to the initial, non-transmitting state. For example, the receiver 120 may be moved out of range of the transmitter 110 such that the receiver 120 is too far from the transmitter 110 to receive the fourth wireless signal 113, and thus the receiver 120 does not send a wireless signal (e.g., the fifth wireless signal 125) including the transmitter identification information uniquely associated with the transmitter 110 capable of restarting the second timeout timer and the second timeout timer elapses. As another example, the energy storage device associated with the receiver 120 may be sufficiently charged (e.g., charged above a threshold level) such that the receiver 120 does not need additional power to be sent via the fourth wireless signal 113. Thus, the receiver 120 may cease sending wireless signals (e.g., the fifth wireless signal 125) including the transmitter identification information uniquely associated with the transmitter 110 such that the second timeout timer elapses.

When in the initial, non-transmitting state, the transmitter 110 may be activated again by the receiver 120 as shown in FIG. 1A, and the system may again progress through the steps shown and described with respect to FIGS. 1A-1G.

In some embodiments, a system may include a transmitter that has a first mode in which the transmitter is configured to send pings to an area surrounding the transmitter such that the pings may be received by one or more receivers, and a second mode in which the transmitter is configured to send wireless power to one or more receivers within the area surrounding the transmitter. For example, FIGS. 2A-2F are schematic illustrations of a system 200 in various stages of operation. The system 200 may be the same or similar in structure and/or function to any of the systems described herein, such as the system 100. For example, the system 200 includes a transmitter 210 and a receiver 220. In some implementations, the transmitter 210 may include or be coupled to a first antenna and a second antenna, the first antenna configured to send wireless power and data via wireless signals and the second antenna configured to receive wireless communications via wireless signals. In some implementations, the first antenna and the second antenna of the transmitter 210 may be configured to operate sequentially and/or simultaneously and over the same or different frequencies. In some implementations, the transmitter 210 may include or be coupled to an antenna configured to both send wireless power and data via wireless signals and receive wireless communications via wireless signals. In some implementations, the receiver 220 may include or be coupled to a first antenna and a second antenna, the first antenna configured to receive wireless power and data via wireless signals and the second antenna configured to send wireless communications via wireless signals. In some implementations, the first antenna and the second antenna of the receiver 220 may be configured to operate sequentially and/or simultaneously and over the same or different frequencies. In some implementations, the receiver 220 may include or be coupled to an antenna configured to both receive wireless power and data via wireless signals and send wireless communications via wireless signals. In some implementations, none of the wireless signals sent by the transmitter 210 and/or the receiver 220 include any geographic location data.

The transmitter 210 may be the same or similar in structure and/or function to any of the transmitters described herein, such as the transmitter 110 described above. The receiver 220 may be the same or similar in structure and/or function to any of the receivers described herein, such as the receiver 120 described above.

The transmitter 210 may have a first mode and a second mode. In the first mode, the transmitter 210 may repeatedly send a number of discrete first wireless signals 211. Each of the first wireless signals 211 (also referred to as "pings") may have a power level and may carry transmitter identification information uniquely associated with the transmitter 210 (e.g., a transmitter identification number). The first wireless signals 211 may be sent by the transmitter 210 at periodic time intervals and/or varying time intervals. The first wireless signals 211 may be sent, for example, every 5-30 seconds. In the second mode, the transmitter 210 may be configured to send a second wireless signal 213. The second wireless signal 213 may have a power level and may carry the transmitter identification information. The second wireless signal 213 may be a pulsed signal or a continuous signal. Each of the first wireless signals 211 and the second wireless signal 213 may include radio frequency (RF) energy. In some implementations, the power level of the first wireless signal 211 may be less than the power level of the second wireless signal 213. For example, the transmitter 210 may send the second wireless signal 213 with a higher power level than the first wireless signal 211 after confirming that the receiver 220 is disposed within a coverage zone (i.e., an area within which the transmitter 210 can transmit wireless power) of the transmitter 210 (e.g., via receiving a wireless signal including the transmitter identification information uniquely associated with the transmitter 210). As another example, the transmitter 210 may send the second wireless signal 213 with a higher power level than the first wireless signal 211 based, at least in part, on an indication of the need for power or charging from the receiver 220 (e.g., via a wireless signal from the receiver 220).

Figure 2A:
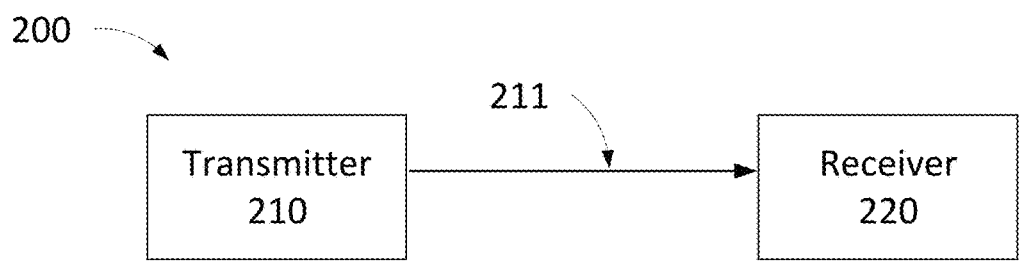
FIGS. 2A-2F are schematic illustrations of a system for wirelessly transferring power, according to an embodiment, in various stages of operation.

As shown in FIG. 2A, the transmitter 210 may send the first wireless signal 211 in the first mode. The first wireless signal 211 may be received by the receiver 220. The receiver 210 may be configured to the first wireless signal 211 such that the receiver 210 is activated by the first wireless signal 211. For example, in some implementations, the receiver 210 may include or be coupled to an RF-powered wireless device. In some implementations, the receiver 210 may include a radio-frequency identification (RFID) tag. Thus, in some implementations, the receiver 210 may be activated such that the receiver 210 is operational in response to receiving power from the first wireless signals 211. In some implementations, the receiver 210 may be operational (e.g., drawing power from an energy storage device such as an on-board battery), but may be activated by the first wireless signal 211 such that the receiver 210 may initiate a wireless communication operation (e.g., read the first wireless signal 211 and/or send a response wireless signal 223) or perform some other operation (e.g., perform an operation in response to receiving the first wireless signal 211).

The transmitter 210 may include a first timeout timer. When the transmitter 210 sends the first wireless signal 211, the first timeout timer may be started. The first timeout timer may have any suitable predetermined time duration. For example, in some implementations, the first timeout timer may have a predetermined time duration of, for example, 3-5 seconds. In some implementations, the predetermined time duration can be any suitable duration longer than the duration of the first wireless signal 211. The predetermined time duration is a period of time within which the transmitter 210 must receive a wireless communication (e.g., a request for power) including the transmitter identification information uniquely associated with the transmitter 210 to transition to the second mode, or else the transmitter 210 will remain in the first mode and continue to send out the discrete first wireless signals 211. Thus, if the transmitter 210 does not receive a wireless signal including the transmitter identification information uniquely associated with the transmitter 210 within the first time duration (e.g., before the first time duration elapses and the first timeout timer runs to zero), the transmitter 210 will not transition to the second mode. If the transmitter 210 receives a wireless signal including the transmitter identification information uniquely associated with the transmitter 210 within the first time duration, the transmitter 210 may transition to the second mode in which the transmitter 210 may send power and data to the receiver 220 to charge the receiver 220.

Figure 2B:
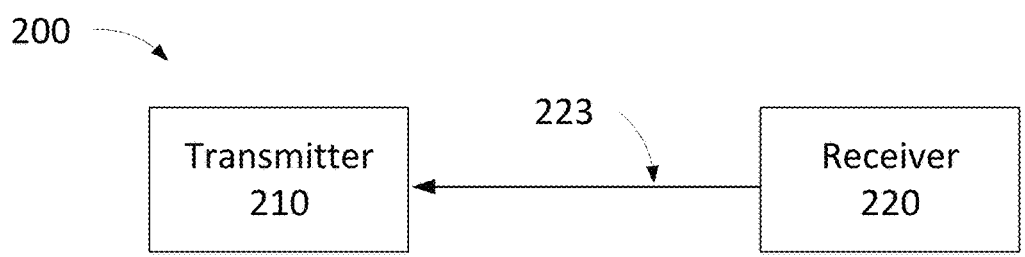

In response to receiving the first wireless signal 211, the receiver 220 may identify (e.g., extract) the transmitter identification information from the first wireless signal 211. The receiver 210 may be configured to send a third wireless signal 223 (e.g., a beacon or other wireless communication) carrying the transmitter identification information. The third wireless signal may also include any suitable information. For example, the third wireless signal 223 may include information representing that an energy level of an energy storage device associated with the receiver 220 has dropped below a threshold level. The third wireless signal 223 may include a request for wireless power. The third wireless signal 223 may include information about the energy storage device (e.g., information representing a stored power level or stored charge percentage of the energy storage device). As shown in FIG. 2B, the third wireless signal 223 may be received by the transmitter 210.

In some implementations, the third wireless signal 223 may include data representing a received signal strength of the first wireless signal 211, and/or an approximate distance between the transmitter 210 and the receiver 220. For example, the receiver 220 may optionally determine (e.g., calculate) the approximate distance between the transmitter 210 and the receiver 220. For example, the receiver 220 may determine the approximate distance between the transmitter 210 and the receiver 220 based, at least in part, on a measurement of the received signal strength of the first wireless signal 211 (e.g., a received signal strength indicator (RSSI)). The receiver 220 may determine whether the approximate distance between the transmitter 210 and the receiver 220 is below a threshold distance, and the receiver 220 may only activate to send the third wireless signal 223 if the approximate distance is below a threshold distance. Alternatively or additionally, the transmitter 210 may determine whether the approximate distance between the transmitter 210 and the receiver 220 is below a threshold distance based on the data included in the third wireless signal 223, and the transmitter 210 may only activate to send wireless power (e.g., via the second wireless signal 213 described below with reference to FIG. 2C) if the approximate distance is below a threshold distance. The threshold distance may be a distance corresponding to the range the transmitter 210 is configured to send wireless power, and the transmitter 210 therefore may be configured to not send wireless power to a requesting receiver 220 if the receiver 220 is too far from the transmitter 210 to receive the wireless power of the transmitter 210.

Figure 2C:
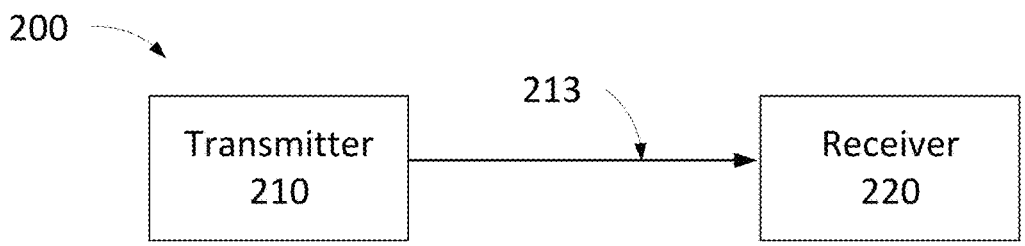

If the transmitter 210 receives the third wireless signal 223 including the transmitter identification information that corresponds to the transmitter 210 within the first time duration such that the first timeout timer has not elapsed (e.g., reached zero), the transmitter 210 may transition from the first mode to the second mode such that the transmitter 210 begins to send the second wireless signal 213, as shown in FIG. 2C. Thus, the transmitter 210 may be able to provide energy to the receiver 220 such that an energy storage device associated with the receiver is charged. In some implementations, the second wireless signal 213 may have any suitable duration longer than the first wireless signal 211.

The transmitter 210 may include a second timeout timer. The transmitter 210 may be configured to send the second wireless signal 213 until the second timeout timer of the transmitter 210 elapses. When the transmitter 210 sends the second wireless signal 213, the second timeout timer may be started. The second timeout timer may have any suitable predetermined time duration. For example, in some implementations, the second timeout timer may have a predetermined time duration of, for example, about one minute. In some implementations, the second predetermined time duration can be any suitable duration longer than the duration of the first wireless signal 211. The predetermined time duration is a period of time within which the transmitter 210 must receive a wireless communication (e.g., a request for power) including the transmitter identification information uniquely associated with the transmitter 210, or else the transmitter 210 will return to the first mode. Thus, if the transmitter 210 does not receive a wireless signal including the transmitter identification information uniquely associated with the transmitter 210 within the second time duration (e.g., before the second time duration elapses and the second timeout timer runs to zero), the transmitter 210 may return to the initial state. If the transmitter 210 receives a wireless signal including the transmitter identification information uniquely associated with the transmitter 210 within the second time duration, the transmitter 210 may reset. The second timeout timer of the transmitter 210 may be configured to reset every time the transmitter 210 receives a wireless communication including the transmitter identification information uniquely associated with the transmitter 210 such that the transmitter 210 may continue sending power and data to the receiver 220 for a period of time significantly longer than the second time duration (e.g., hours). Furthermore, the second timeout timer of the transmitter 210 may be configured to reset regardless of the source of the wireless communication including the transmitter identification information. Thus, if the system 200 includes a number of receivers, a wireless communication including the transmitter identification information uniquely associated with the transmitter 210 from any of the receivers (i.e., fewer than all the receivers) may reset the second timeout timer of the transmitter 210.

Figure 2D:
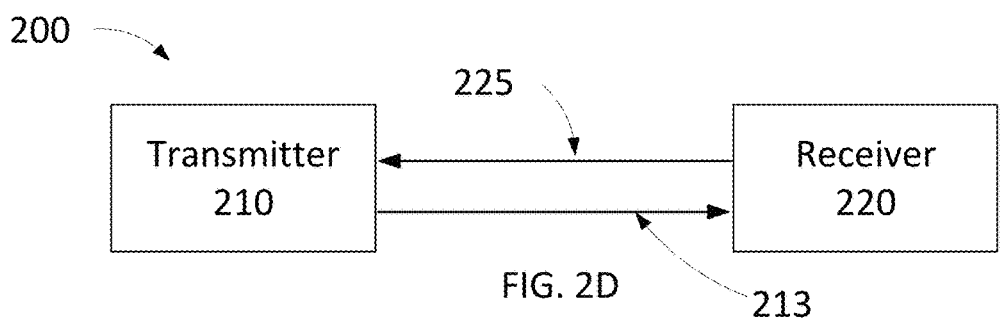

As shown in FIG. 2D, in response to the receiver 220 receiving the second wireless signal 213, and prior to the second timeout timer elapsing while the second wireless signal 213 is being sent by the transmitter 210, the receiver may send a fourth wireless signal 225. The fourth wireless signal 225 may include the transmitter identification information uniquely associated with the transmitter 210. The fourth wireless signal 225 may also include any other suitable communication and/or data. For example, the fourth wireless signal 225 may include information representing the charging need of the energy storage source associated with the receiver 220. In some implementations, the fourth wireless signal 225 may be the same or similar to the third wireless signal 223. In some implementations, the fourth wireless signal 225 may be different from the third wireless signal 223. For example, the fourth wireless signal 225 may include updated information representing the charging need of the energy storage source associated with the receiver 220 compared to the third wireless signal 223. As another example, the fourth wireless signal 225 may include an updated received signal strength of the second wireless signal 213, and/or an approximate distance between the transmitter 210 and the receiver 220 compared to the third wireless signal 223. The transmitter 210 may discontinue sending the second wireless signal 213 if the received signal strength of the second wireless signal 213 is below a threshold received signal strength and/or the transmitter 210 determines that an approximate distance between the transmitter 210 and the receiver 220 is above a threshold (i.e., the receiver 220 is out of range of the transmitter 210).

Figure 2E:
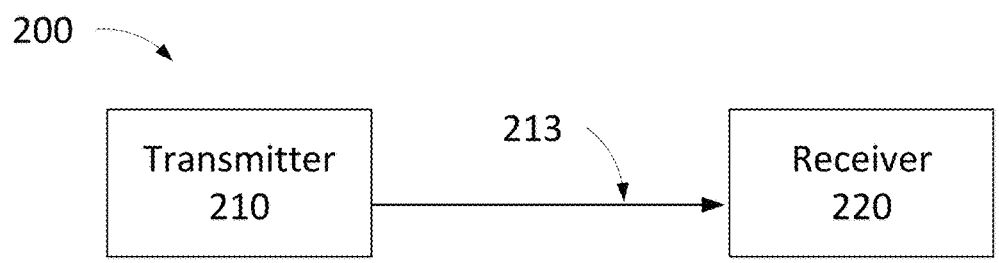

As shown in FIG. 2E, if the fourth wireless signal 225 is received by the transmitter 210 prior to the second timeout timer elapsing, the second timeout timer may restart because the transmitter 210 received a wireless communication including transmitter identification information uniquely associated with the transmitter 210 (i.e., the fourth wireless signal 225). Thus, the transmitter 210 may continue transmitting the second wireless signal 213 for a longer time period than if the transmitter 210 had not received the fourth wireless signal 225 or another wireless communication including transmitter identification information uniquely associated with the transmitter 210.

Although not shown, the transmitter 210 may continue sending the second wireless signal 213 indefinitely as long as the transmitter 210 continues to receive wireless communications including transmitter identification information uniquely associated with the transmitter 210. For example, the system 200 may repeatedly cycle between the steps described with respect to FIGS. 2D and 2E until sufficient wireless power has been delivered via the second wireless signal 213 to the receiver 220 to charge the energy storage device associated with receiver 220 above a threshold energy storage level. In some implementations, the receiver 220 may send wireless signals (e.g., beacons) similar to or the same as the fourth wireless signal 225 at periodic or varying time intervals while the receiver 220 is receiving the second wireless signal 213, confirming to the transmitter 210 that a receiver is still receiving the second wireless signal 213. In some implementations, the wireless signals sent by the receiver 220 while the receiver 220 is receiving the second wireless signal 213 may each reflect a current or updated status of the receiver 220, such as, for example, the energy storage level of the energy storage device associated with the receiver 220.

Figure 2F:
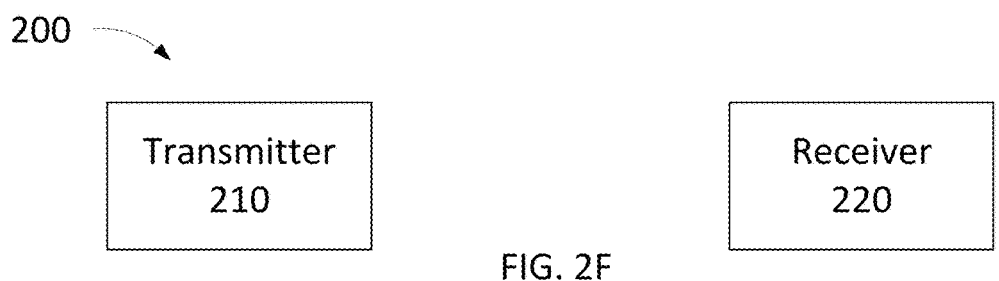

When the transmitter 210 does not receive a wireless communication including transmitter identification information uniquely associated with the transmitter 210 within the predetermined second time duration of the second timeout timer, the transmitter 210 may cease sending the second wireless signal 213, as shown in FIG. 2F, and transition back to the first mode. For example, the receiver 220 may be moved out of range of the transmitter 210 such that the receiver 220 is too far from the transmitter 210 to receive the second wireless signal 213, and thus the receiver 220 does not send a wireless signal (e.g., the fourth wireless signal 225) including the transmitter identification information uniquely associated with the transmitter 210 capable of restarting the second timeout timer and the second timeout timer elapses. As another example, the energy storage device associated with the receiver 220 may be sufficiently charged (e.g., charged above a threshold level) such that the receiver 220 does not need additional power to be sent via the second wireless signal 213. Thus, the receiver 220 may cease sending wireless signals (e.g., the third wireless signal 225) including the transmitter identification information uniquely associated with the transmitter 210 such that the second timeout timer elapses.

When in the first mode, the transmitter 210 may be activated again by the receiver 220 as shown in FIG. 2B such that the transmitter 210 again transition to the second mode, and the system may again progress through the steps shown and described with respect to FIGS. 2A-2F.

In some implementations, the power level of the second wireless signal 213 may be based, at least in part, on a distance between the transmitter 210 and the receiver 220 (e.g., based at least in part on a received signal strength of any wireless signal described herein, such as the first wireless signal 211, the second wireless signal 213, the third wireless signal 223, and/or the fourth wireless signal 225). For example, if a received signal strength of a wireless signal received by the transmitter 210 is below a threshold signal strength, the transmitter 210 may send the second wireless signal 213 at a higher power level than if the signal strength of the wireless signal received by the transmitter 210 was below the threshold signal strength. In some implementations, the power level of the second wireless signal 213 may be based, at least in part, on a particular operational power need of the receiver 220 or the need for charging power to augment the stored power in an energy storage device associated with the receiver 220. For example, if the receiver 220 requires a particular amount of energy to operate, the transmitter 210 may send the second wireless signal 213 at a higher power level than the receiver 220 required a lower amount of energy to operate. As another example, if the stored power in an energy storage device associated with the receiver 220 is below a threshold stored power level (e.g., battery level), the transmitter 210 may send the second wireless signal 213 at a higher power level than if the stored power in the energy storage device associated with the receiver 220 is above the threshold stored power level.

Figure 3:
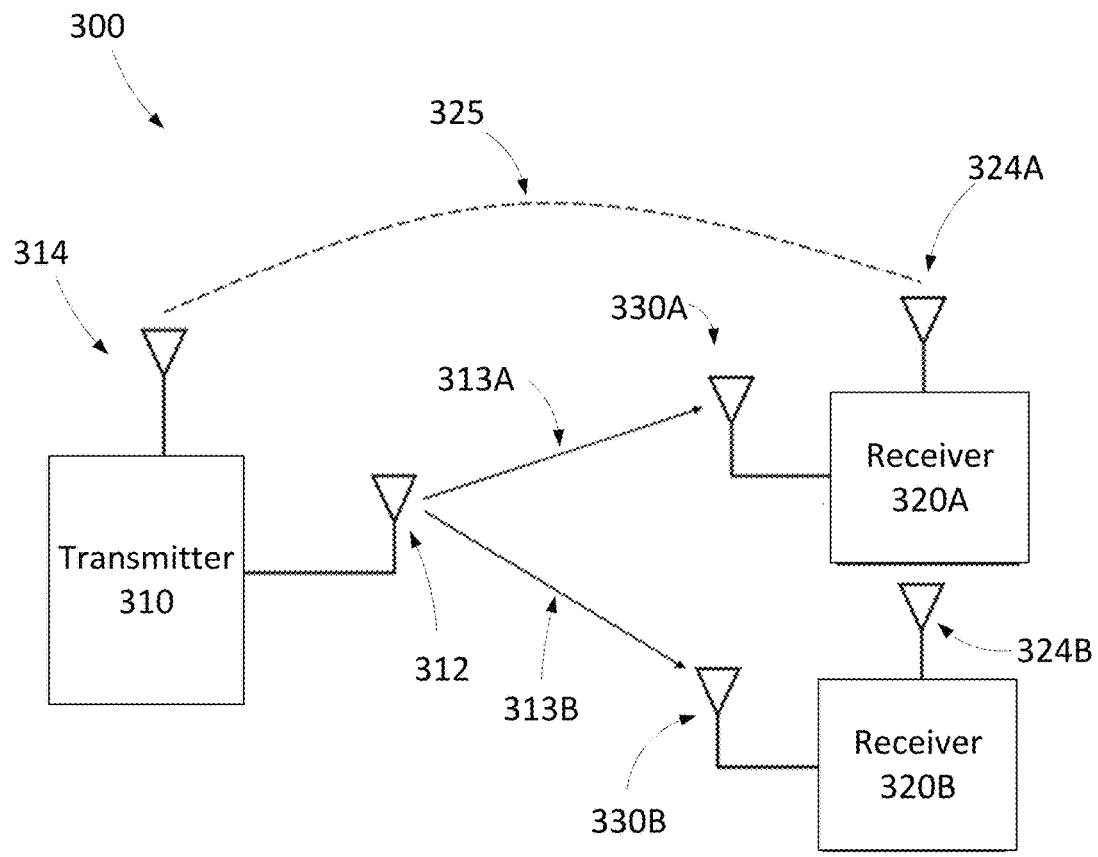
FIG. 3 is a schematic illustration of a system for wirelessly transferring power, according to an embodiment.

As discussed above, in some embodiments, each of a transmitter and a receiver may include a first antenna and a second antenna. For example, FIG. 3 is a schematic illustration of a system 300. The system 300 may be the same or similar in structure and/or function to any of the systems described herein. For example, the system 300 may include a transmitter 310, a first receiver 320A, and a second receiver 320B. The transmitter 310 may be the same or similar in structure and/or function to any of the transmitters described herein. The first receiver 320A and the second receiver 320B may be the same or similar in structure and/or function to any of the receivers described herein.

As shown, the transmitter 310 may include a first antenna 312 and a second antenna 314. The first antenna 312 may be configured to transmit power (e.g., powering and/or charging energy) and data. The second antenna 314 may be configured to receive data (e.g., communication data). The first receiver 320A may include a first antenna 330A and a second antenna 324A, and the second receiver 320B may include a first antenna 330B and a second antenna 324B. Each of the first antennas (e.g., 330A and 330B) may be configured to receive power (e.g., powering and/or charging energy) and data. Each of the second antennas (e.g., 324A and 324B) may be configured to transmit data (e.g., communication data).

As shown, the transmitter 310 may be configured to transmit signals 313A and 313B over a first frequency such that the signals are received by the first antennas 330A and 330B of the first receiver 320A and the second receiver 320B, respectively. The signals 313A and 313B may each include a power level such that the signals 313A and 313B may transmit wireless energy to the first receiver 320A and the second receiver 320B, respectively. The signals 313A and 313B may also carry transmitter identification information uniquely associated with the transmitter 310 (e.g., a transmitter identification number).

Each of the receivers 320A may be configured to extract the transmitter identification information from the respective signals 313A and 313B and send a wireless response signal over a second frequency to the transmitter 310 (e.g., the wireless response signal including the transmitter identification information). For example, as shown in FIG. 3, the first receiver 320A may send a wireless response signal 325 to the second antenna 314 of the transmitter 310 that may include the transmitter identification information uniquely associated with the transmitter 310. The second frequency may be a different frequency than the first frequency.

As shown in FIG. 3, the transmitter 310 may simultaneously transmit wireless power to both the receiver 320A and the receiver 320B. Even if the first receiver 320A is the only receiver to send wireless communications (e.g., wireless response signal 325) to the transmitter 310, the transmitter 310 may still be transitioned from a first mode to a second mode and/or a timeout timer of the transmitter 310 may be reset such that the transmitter 310 may send wireless power to the first receiver 320A and any other receivers in range (e.g., the second receiver 320B).

Figure 4:
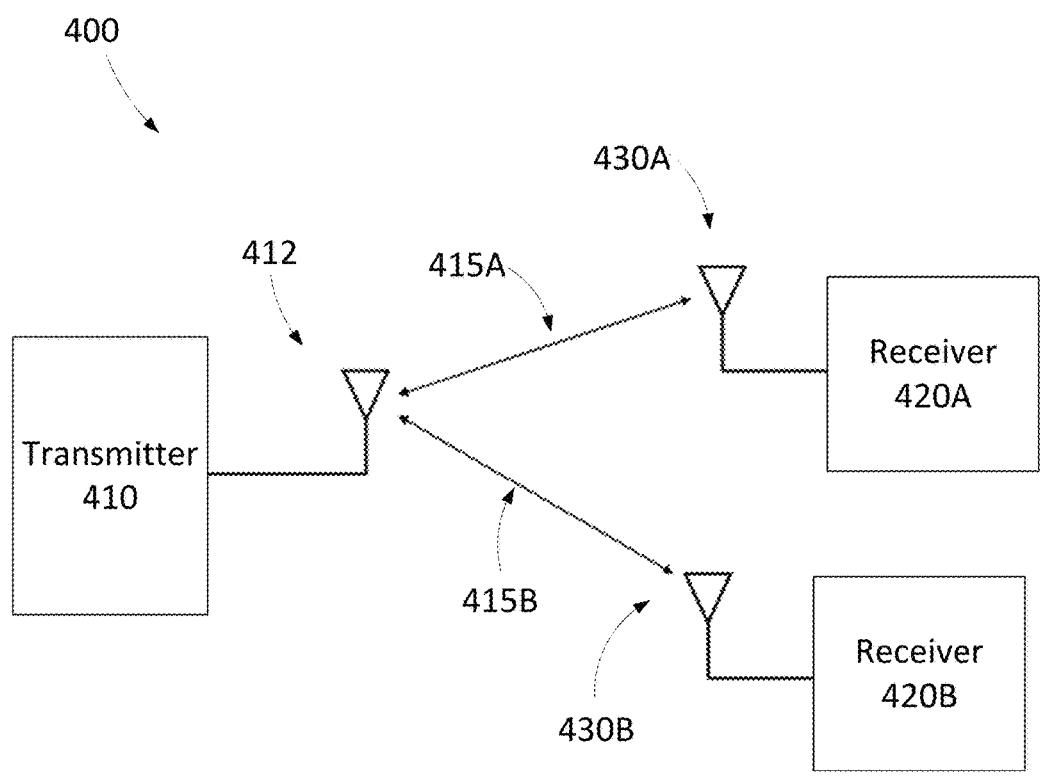
FIG. 4 is a schematic illustration of a system for wirelessly transferring power, according to an embodiment.

Although FIG. 3 shows a system transmitting power and wireless communications over two different frequencies, in some embodiments a system can communicate power and wireless communications over the same frequency. For example, FIG. 4 is a schematic illustration of a system 400. The system 400 may be the same or similar in structure and/or function to any of the systems described herein. For example, the system 400 may include a transmitter 410, a first receiver 420A, and a second receiver 420B. The transmitter 410 may be similar in structure and/or function to any of the transmitters described herein. The first receiver 420A and the second receiver 420B may be similar in structure and/or function to any of the receivers described herein.

As shown, the transmitter 410 may include an antenna 412. The antenna 412 may be configured to transmit power (e.g., powering and/or charging energy) and data and to receive data (e.g., communication data). The first receiver 420A may include an antenna 430A and the second receiver 420B may include an antenna 430B. Each of the antennas of the receivers (e.g., 430A and 430B) may be configured to receive power (e.g., powering and/or charging energy) and data and to transmit data (e.g., communication data).

As shown, the transmitter 410 may be configured to transmit signals over the paths represented by arrows 415A and 415B over a first frequency such that the signals are received by the antennas 430A and 430B of the first receiver 420A and the second receiver 420B, respectively. The signals may each include a power level such that the signals may transmit wireless energy to the first receiver 420A and the second receiver 420B, respectively. The signals may also carry transmitter identification information uniquely associated with the transmitter 410 (e.g., a transmitter identification number).

Each of the receivers 420A may be configured to extract the transmitter identification information from the respective signals and send a wireless response signal over the first frequency to the transmitter 410 (e.g., the wireless response signal including the transmitter identification information). For example, as shown in FIG. 4, the first receiver 420A may send a wireless response signal over the paths represented by arrows 415A and 415B to the antenna 412 of the transmitter 410 that may include the transmitter identification information uniquely associated with the transmitter 410.

As shown in FIG. 4, the transmitter 410 may simultaneously transmit wireless power to both the first receiver 420A and the second receiver 420B. Even if the first receiver 420A is the only receiver to send wireless communications (e.g., wireless response signal over the path 415A) to the transmitter 410, the transmitter 410 may still be transitioned from a first mode to a second mode and/or a timeout timer of the transmitter 410 may be reset such that the transmitter 410 may send wireless power to the first receiver 420A and any other receivers in range (e.g., the second receiver 420B).

In some embodiments, a transmitter such as any of the transmitters described herein and/or a receiver such as any of the receivers described herein may have public and/or private encryption keys.

In some embodiments, a transmitter, such as any of the transmitters described herein, may include one or more motors such that a position and/or polarization of one or more antennas of the transmitter may be adjusted by the one or more motors to direct power (e.g., RF energy) toward a receiving antenna (e.g., a receiving antenna of a receiver of a system including the transmitter) more accurately and/or directly.

In some embodiments, a transmitter, such as any of the transmitters described herein, may include antennas with multiple polarizations. A receiver, such as any of the receivers described herein, may indicate the desired polarization of power (e.g., RF energy) to be sent by the transmitter (e.g., via inclusion of the desired polarization in a wireless signal that may also include transmitter identification information) and the transmitter may energize the antennas to the corresponding polarization. For example, the receiver may include a horizontally-polarized antenna disposed on a horizontal product. The transmitter may include a dual port patch antenna. The transmitter may switch to the horizontal port on the patch antenna when the transmitter receives a wireless signal including the desired polarization (e.g., a ping may produce data from a receiver tag showing the need for horizontally polarized charging).

In some embodiments, a transmitter, which may be the same or similar in structure and/or function to any of the transmitters described herein, may have the ability to dynamically adjust a transmission power of the transmitter based, at least in part, on a state of charge of an energy storage device coupled to a receiver, which may be the same or similar in structure and/or function to any of the transmitters described herein. The transmitter may return to a first or ping mode when the energy storage is fully charged.

In some embodiments, a transmitter, which may be the same or similar in structure and/or function to any of the transmitters described herein, may include directors and/or reflectors that can be dynamically changed to shape the radiation pattern of an antenna of the transmitter. For example, a switch may be used to activate or deactivate a director and/or reflector to point the energy (e.g., RF energy) toward a receiver. The switch may be a relay or a semiconductor switch. In some implementations, each director or reflector corresponds to a switch that is either open or connected to RF ground. In some implementations, the transmitter may be configured to transmit power to a zone or area (e.g., for powering and/or charging receivers that may be disposed within the zone or area). Directors and/or reflectors may be adjusted to rotate and/or shift the zone. For example, the zone may be rotated 25 degrees to the right or clockwise from a first configuration to a second configuration such that a number of receivers (e.g., one, two, five, or more receivers) disposed outside the zone when the zone is in the first configuration are disposed within the zone and able to receive wireless power from the transmitter in the second configuration. In some implementations, the transmitter does not direct wireless power toward a particular receiver, but rather transmits wireless power to a coverage zone or area, such that shifting or rotating the coverage area may result in one or more receivers being disposed within the coverage zone or area and therefore able to receive the wireless power.

In some embodiments, a system, such as any of the systems described herein, may include multiple receivers. In such embodiments, if a first receiver of the multiple receivers has completed charging (e.g., an energy storage device associated with the receiver has been charged to or above a threshold charge level), the first receiver may adjust a radar cross section of an antenna of the first receiver to help focus energy that may be received via a signal of a transmitter of the system on one or more of the remaining receivers. For example, the radar cross section may be adjusted by properly loading the antenna terminals to reflect energy away from the receiver.

In some embodiments, any of the receivers described herein may measure a harvested current based on a wireless signal received from a transmitter. The transmitter, which may be any of the transmitters described herein, may have a threshold current necessary to enable continuous transmission. Thus, the receiver may measure the current of a received wireless signal and communicate the measured current to the transmitter. The transmitter may then adjust the a current of the wireless signal or discontinue sending the wireless signal.

In some embodiments, any of the receivers described herein may adjust a tuning network of the receiver to ensure maximum power point tracking as the operating point of the receiver changes due to, for example, changes in distance between a transmitter and the receiver and/or state of charge of an energy storage device (e.g., a charge level of a battery) associated with the receiver. The receiver may adjust its tuning based on, for example, measured harvested power or current.

In some embodiments, a system may include a transmitter configured to use a separate BLE channel for receiving beacons from multiple devices (e.g., receivers) The transmitter can be the same or similar in any of the transmitters described herein. The transmitter may periodically send an 8-bit transmitter identification number (ID) when the transmitter is powered on. For example, the transmitter may not send any data for a random delay of 2-10 ms when transmitting. The transmitter may then send its 8-bit transmitter ID at 16,667 baud, using 1 start bit, 8 data bits, an even parity, and 1 stop bit. As long as the transmitter is on, the transmitter may repeat this process. The transmitter may receive and process three different types of BLE beacons (e.g., a set time beacon, a schedule beacon, and/or a power request beacon). The set time beacon may set the time in the transmitter such that the transmitter may use a schedule. The schedule beacon may set period of times when the transmitter's power is not allowed to be turned on. The power request beacon may request the transmitter turn on power for wireless transmission.

In the event that the transmitter is scheduled to not transmit power (e.g., as a result of the schedule sent by the schedule beacon), if the power request beacon is received by the transmitter, the transmitter will ignore the power request beacon. If the transmitter is not scheduled to not transmit power, and if the power request beacon is received by the transmitter, the transmitter will transmit wireless power if the power request beacon contains the transmitter's transmitter ID (e.g., 0x01-0xFF). For example, the transmitter may transmit wireless power for one minute or for one additional minute from the time of receiving the power request beacon. In some embodiments, the transmitter may be configured to receive a special broadcast transmitter ID from a sender device. The transmitter may then transmit wireless power for at least 2 seconds or 2 additional seconds. If the sender device of the transmitter ID is out of a power transmission range of the transmitter, the transmitter may continue receiving the special broadcast transmitter ID (rather than a wireless communication including the transmitter ID). If the transmitter receives too many special broadcast transmitter IDs lacking the transmitter ID (e.g., 5), the transmitter may block the sender device for a period of time (e.g., 10 minutes). As a result, a user may move the sender device closer to the transmitter such that the sender device may be within the power range of the transmitter. In some embodiments, the transmitter may include a button or other activation element (or actuator). If the button is pressed, the transmitter may turn on the transmission power for a period of time (e.g., 30 minutes), even in the absence of receiving beacons. Thus, an energy storage device (e.g., a battery) may be charged that is too low in stored energy to power a receiver associated with the energy storage device to send BLE beacons. Activating the button may override any scheduled non-transmitting time.

In some embodiments, a system may include a receiver configured to periodically send BLE power request beacons when an energy storage device (e.g., a battery) associated with the receiver needs to be charged and the energy storage level (e.g., battery level) of the energy storage device is not too low to send a BLE power request beacon. The receiver may be the same or similar in structure and/or function to any of the receivers described herein. As described above, if the energy storage level of the receiver is too low, a user may activate a transmitter (such as the transmitter described above) via, for example, pressing a button, such that the transmitter transmits wireless energy to charge the energy storage device associated with the receiver for a period of time. The receiver may include multiple BLE advertising rates. For example, when using the broadcast transmitter ID, the advertising rate may be 2 seconds. When using a non-zero transmitter ID, the advertising rate may be 10 seconds. In some implementations, when the receiver is requesting power, the receiver may try to receive the transmitter ID data that may be sent with the power. When the receiver receives the transmitter ID, the receiver may include the transmitter ID in a BLE power request beacon. Until the transmitter ID is received, the receiver may use the broadcast transmitter ID in the BLE power request beacon. In some implementations, if the receiver recognizes (e.g., detects) that the receiver is no longer being charged by a specific transmitter, the receiver will begin sending the broadcast transmitter ID rather than a specific transmitter ID for a specific transmitter. When the power storage device associated with the receiver is fully charged, the device will stop sending BLE power request beacons.

In some embodiments, a receiver device may include a first receiver and a second receiver. The first receiver and the second receiver may be the same or similar in structure and/or function to any of the receivers described herein. For example, the first receiver may include or be coupled to an energy storage device and may be configured to transmit wireless communications. The second receiver may not include or be coupled to an energy storage device, but may include or be coupled to an indicator component (e.g., a light component such as an LED). The second receiver also may include no wireless communication components such that the second receiver cannot send any wireless data or other communications. The second receiver may be configured to receive wireless power such that the wireless power activates the indicator component such that a user may confirm that the second receiver is within a wireless power transmission range or zone of a wireless power transmitter. For example, a light component may illuminate such that the user may visually confirm that the second receiver is receiving wireless power. The first receiver and the second receiver may be coupled to each other or disposed near or adjacent each other such that, when the first receiver and the second receiver are within wireless power transmission range of a transmitter, the second receiver will indicate to the user that both first receiver and the second receiver are within the wireless power transmission range of the transmitter, while the first receiver may send wireless communications to the transmitter (e.g., including requests for power and/or transmitter identification information) similarly to any of the systems or methods described herein.

Figure 5:
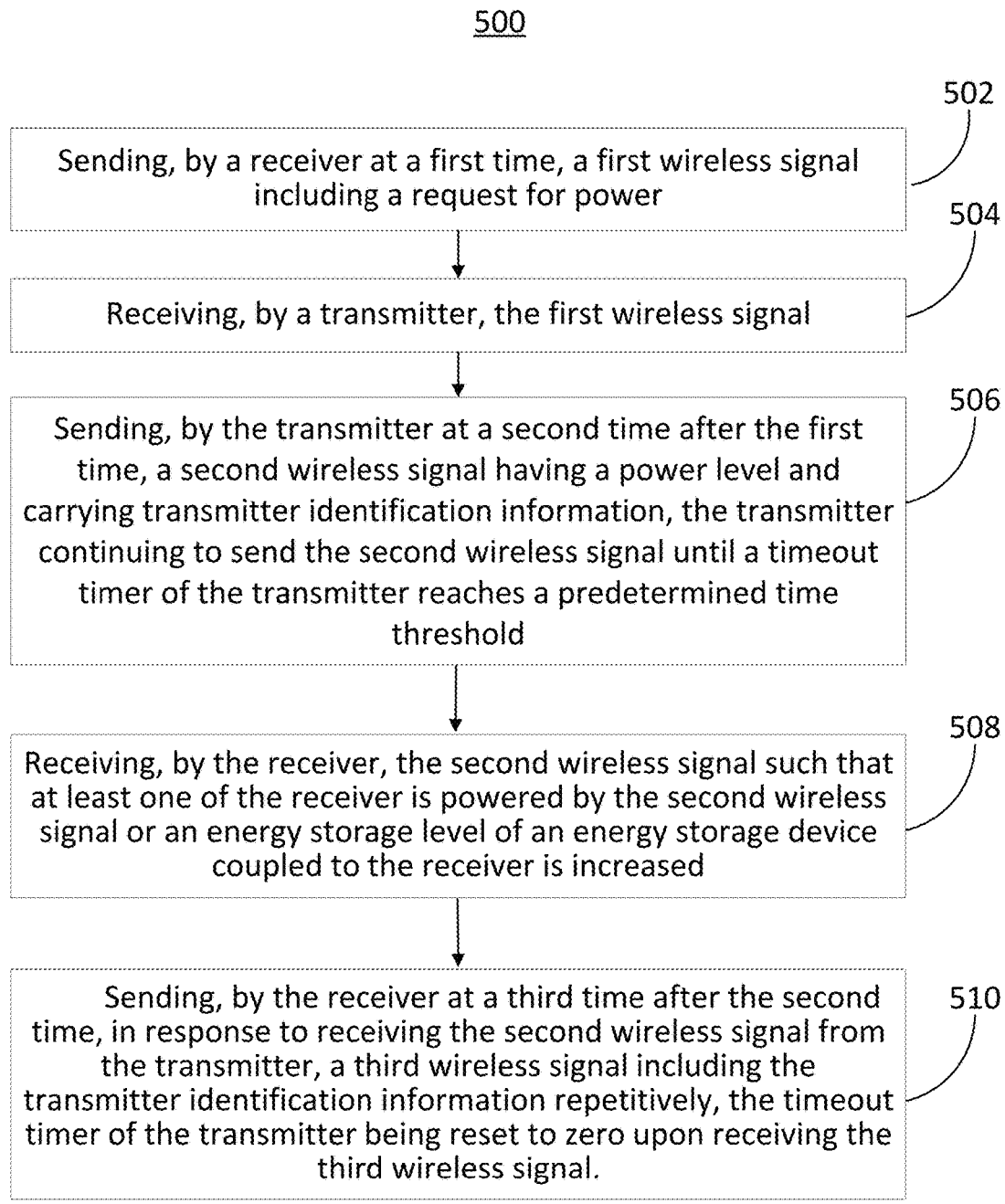
FIG. 5 is a flow chart of a method of wirelessly transferring power, according to an embodiment.

FIG. 5 is a flowchart illustrating a method 500 of transmitting wireless power, according to an embodiment. The method 500 may be performed by any of the systems described herein. As shown in FIG. 5, the method includes sending 502, by a receiver at a first time, a first wireless signal including a request for power. The first wireless signal may be received 504 by a transmitter. At a second time after the first time, the transmitter may send 506 a second wireless signal having a power level and carrying transmitter identification information. The transmitter may continue to send the second wireless signal until a timeout timer of the transmitter reaches a predetermined time threshold.

The second wireless signal may be received 508 by the receiver such that at least one of the receiver is powered by the second wireless signal or an energy storage level of an energy storage device coupled to the receiver is increased. At a third time after the second time, the receiver may send 510, in response to receiving the second wireless signal from the transmitter, a third wireless signal including the transmitter identification information repetitively. The timeout timer of the transmitter may be reset to zero upon receiving the third wireless signal.

In some embodiments, prior to sending the first wireless signal by the receiver at the first time, the transmitter may send a fourth wireless signal having a power level and carrying the transmitter identification information. The first wireless signal may include the transmitter identification information.

In some embodiments, the receiver may determine a distance between the receiver and the transmitter. The third wireless signal may only be sent by the receiver if the distance is below a threshold distance. In some embodiments, the transmitter may determine a distance between the receiver and the transmitter. The second wireless signal is only sent by the transmitter if the distance is below a threshold distance.

In some embodiments, the receiver may be a first receiver, and a second receiver may receive the second wireless signal such that at least one of the second receiver is powered by the second wireless signal or an energy storage level of an energy storage device coupled to the second receiver is increased. The second receiver may send, in response to receiving the second wireless signal from the transmitter, a fourth wireless signal including the transmitter identification information repetitively. The timeout timer of the transmitter may be reset to zero upon receiving the fourth wireless signal.

In some embodiments, as described above, a single antenna may be used by a receiver for power harvesting and two-way data communication. For example, a single antenna may be used to perform both power harvesting and RFID backscatter simultaneously. Thus, in some embodiments, a single standard value antenna can be used to operate both an RFID tag and RF energy harvesting circuitry simultaneously.

Historically, RFID tags have been designed with a custom complex input impedance such as 12-j199. By the maximum power transfer theorem, a corresponding RFID antenna would require a complex impedance of 12+j199. Such a complex impedance may be problematic and limiting, however, because standard RF equipment typically assumes a standard antenna impedance of 50 ohms.

Input impedance of an RFID tag (or any complex impedance), however, may be transformed to a different value that is suited for power harvesting and data communication (e.g., to be used with or included in any of the receivers described herein). Such a transformation may allow the use of standard antenna impedances and lab equipment in testing systems using an RFID tag. Also, such a transformation may allow for the usage of RF energy harvesting and standard RFID backscatter communication simultaneously.

Several methods and/or antenna system may be used to simultaneously harvest RF energy while enabling RFID tag operation. For example, a directional coupler may be used in conjunction with a balun and impedance matching networks. As another example, a power splitter may be used in conjunction with a balun and impedance matching networks. As another example, only a balun and impedance matching networks may be used. As another example, a switching network in conjunction with a balun and impedance matching network may be used. As another example, a balun and an impedance matching network may be arranged in parallel with a harvester circuit.

Thus, the complex impedance of an RFID chip's input impedance may be transformed to another value such that a different, possibly more standard antenna may be used with the RFID chip. Most RF antenna systems are designed to have an impedance of 50 ohms, but can be designed to have an impedance of any non-complex or complex value.

Figure 6:
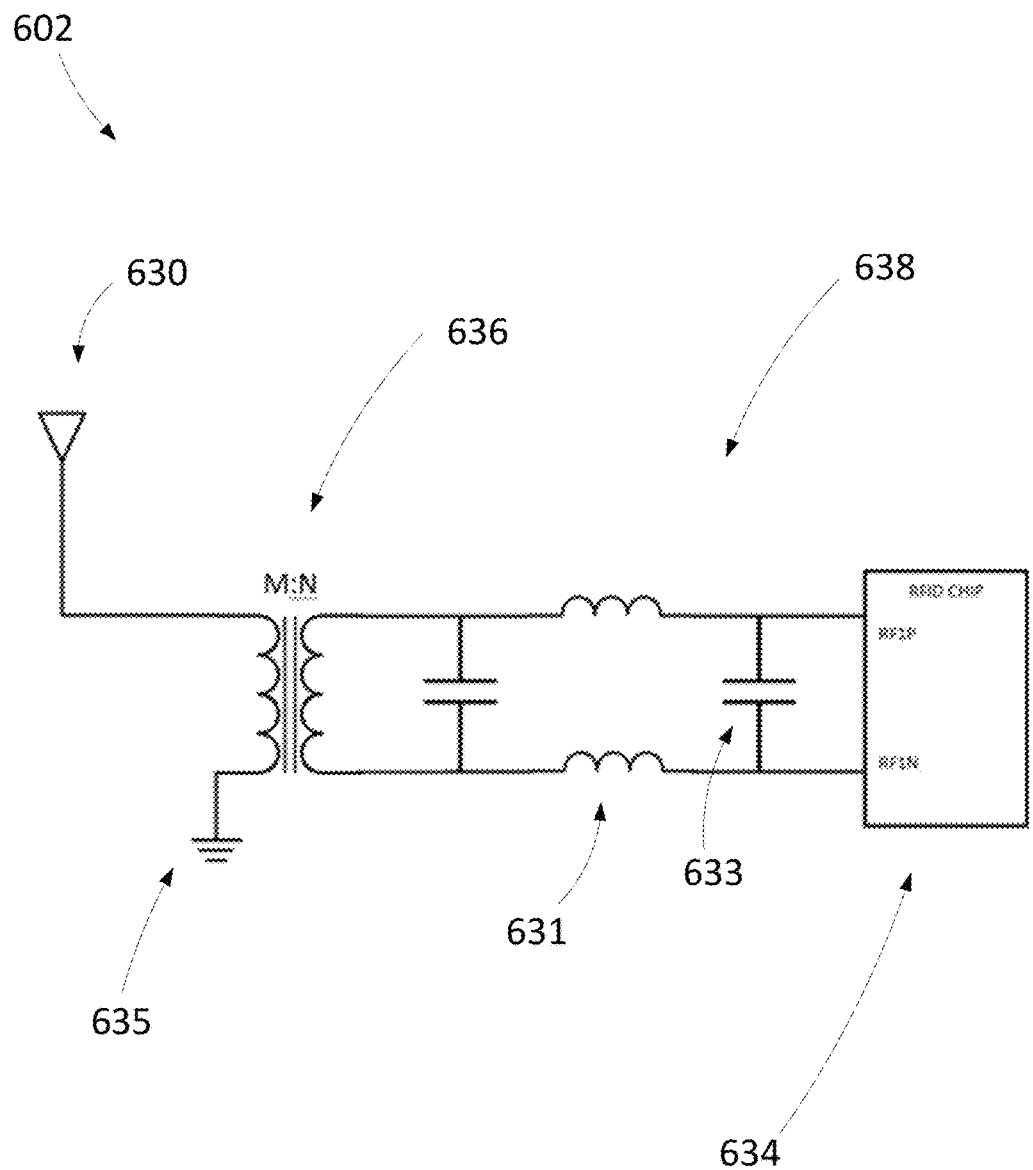
FIG. 6 is a schematic illustration of a system including an antenna, according to an embodiment.

For example, FIG. 6 is a schematic representation of a system 602. The system 602 may be included in or coupled to any of the receivers described herein. The system 602 may include an antenna 630, a balun 636, tuning components 638, an RFID chip 634, and a ground 635. The tuning components 638 may include, for example, capacitors 633 and inductors 631. The balun 636 may have an M:N turns ratio. The tuning components 638 and the balun 636 may be used collectively to transform the complex impedance of the RFID chip 634 to a more standard value by reflecting the impedance of the RFID chip 634 into the primary of the balun 636. Although the balun 636 in FIG. 6 is represented as a transformer type balun, the balun may be implemented with transmission lines, structures, and/or discrete components.

Figure 7:
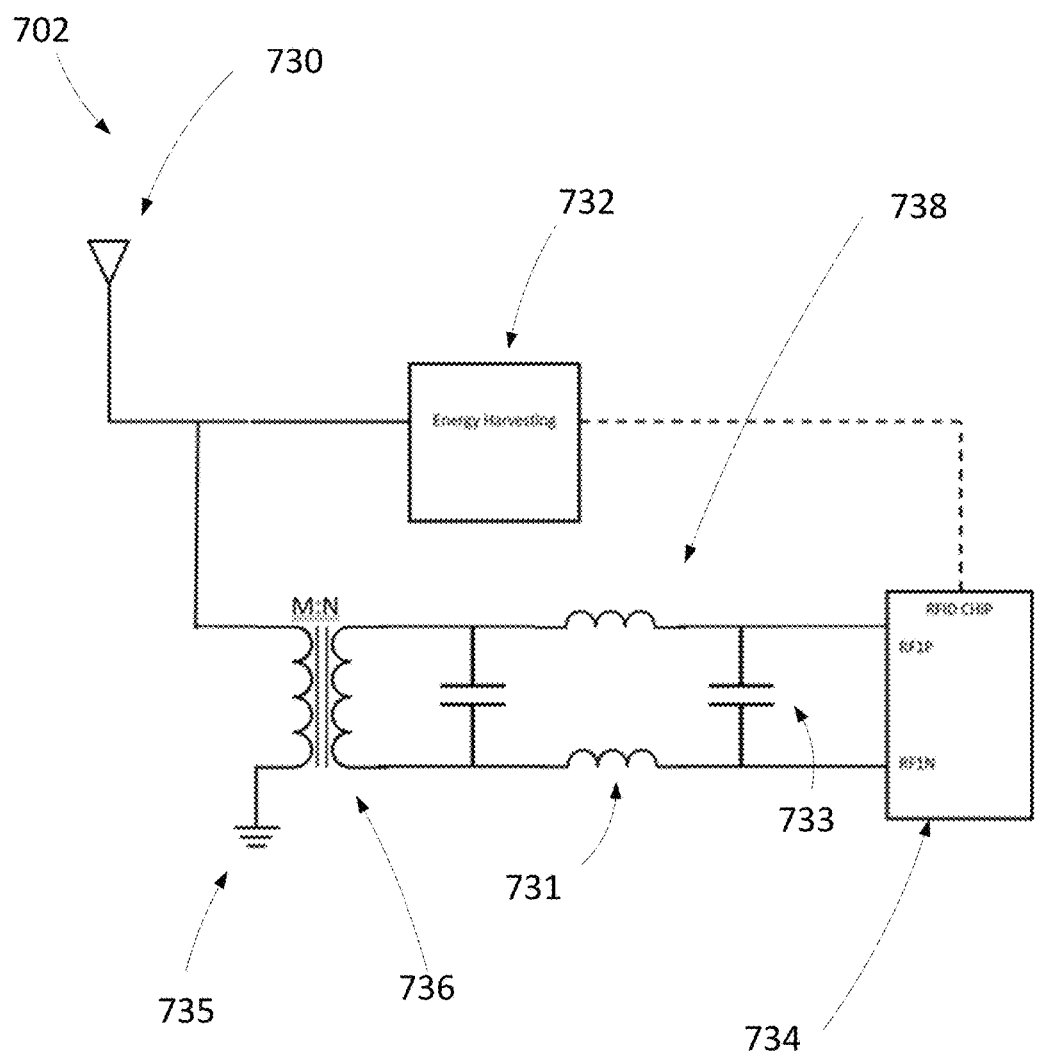
FIG. 7 is a schematic illustration of a system including an antenna, according to an embodiment.

FIG. 7 is a schematic representation of a system 702. The system 702 may be included in or coupled to any of the receivers described herein. The system 702 may include an antenna 730, an energy harvesting circuit 732, a balun 736, an impedance matching network 738, an RFID chip 734, and a ground 735. The impedance matching network 738 may include, for example, capacitors 733 and inductors 731. The balun 736 may have an M:N turns ratio. As shown in FIG. 7, the energy harvesting circuit 732 may be placed in parallel with the balun 736, the impedance matching network 738, and the RFID chip 734. The antenna 730 in the system 702 may not be limited to a standard 50 ohms. The system 702 may include a first impedance matching circuit (not shown) associated with the energy harvesting circuit 732 in addition to the second impedance matching network 738 associated with the RFID chip 734. The energy harvesting circuit 732 may provide power to the RFID chip 734 to enhance the read and/or write sensitivity of the RFID chip 734, giving the RFID chip greater range. In some implementations, the antenna 730 may be a balanced antenna and the balun 736 may not be included in the system 702.

Figure 8:
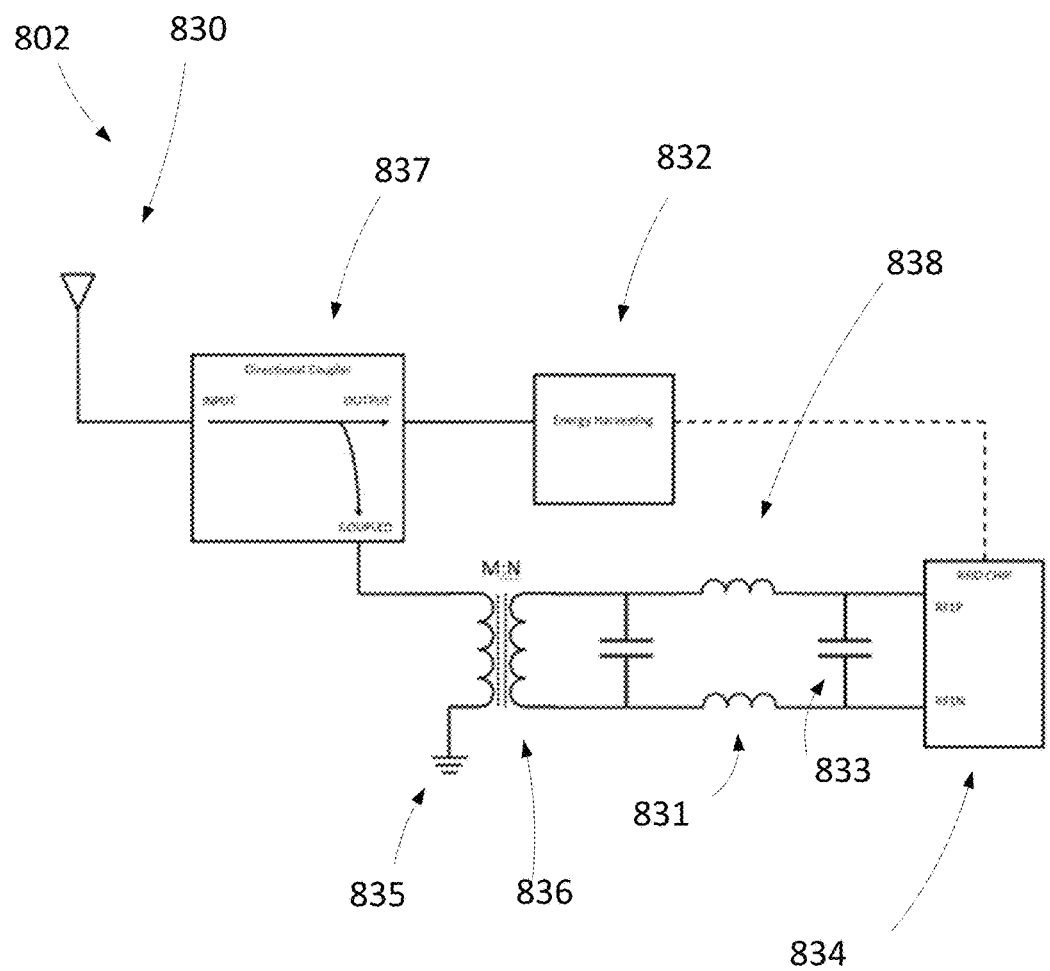
FIG. 8 is a schematic illustration of a system including an antenna, according to an embodiment.

FIG. 8 is a schematic representation of a system 802. The system 802 may be included in or coupled to any of the receivers described herein. The system 802 may include an antenna 830, a directional coupler 837, an energy harvesting circuit 832 (e.g., for harvesting RF energy), a balun 836, an impedance matching network 838, an RFID chip 834, and a ground 835. The impedance matching network 838 may include, for example, capacitors 833 and inductors 831. The balun 836 may have an M:N turns ratio. As shown in FIG. 8, the directional coupler 837 may include an input (i.e., an input port), an output (i.e., a transmitted port), and a coupled port. The output of the directional coupler 837 may be coupled to the energy harvesting circuit 832. The balun 836 may be coupled to the coupled port of the directional coupler 837 such that the balun 836 and the impedance matching network 838 are coupled to the coupled port of the directional coupler 837. Power may be applied to the input of the directional coupler 837 from the antenna 830, a portion of the power may flow through the coupled port to the balun 836 and the RFID matching network 838, and the remainder of the power may flow from the output to the energy harvesting circuit 832. The system 802 may also include a standard 50 ohm antenna. The system 802 may perform RFID and RF energy harvesting simultaneously. The energy harvesting circuit 832 may bias and provide power to the RFID chip 834 to enhance the range and sensitivity of the energy harvesting circuit 832.

Figure 9:
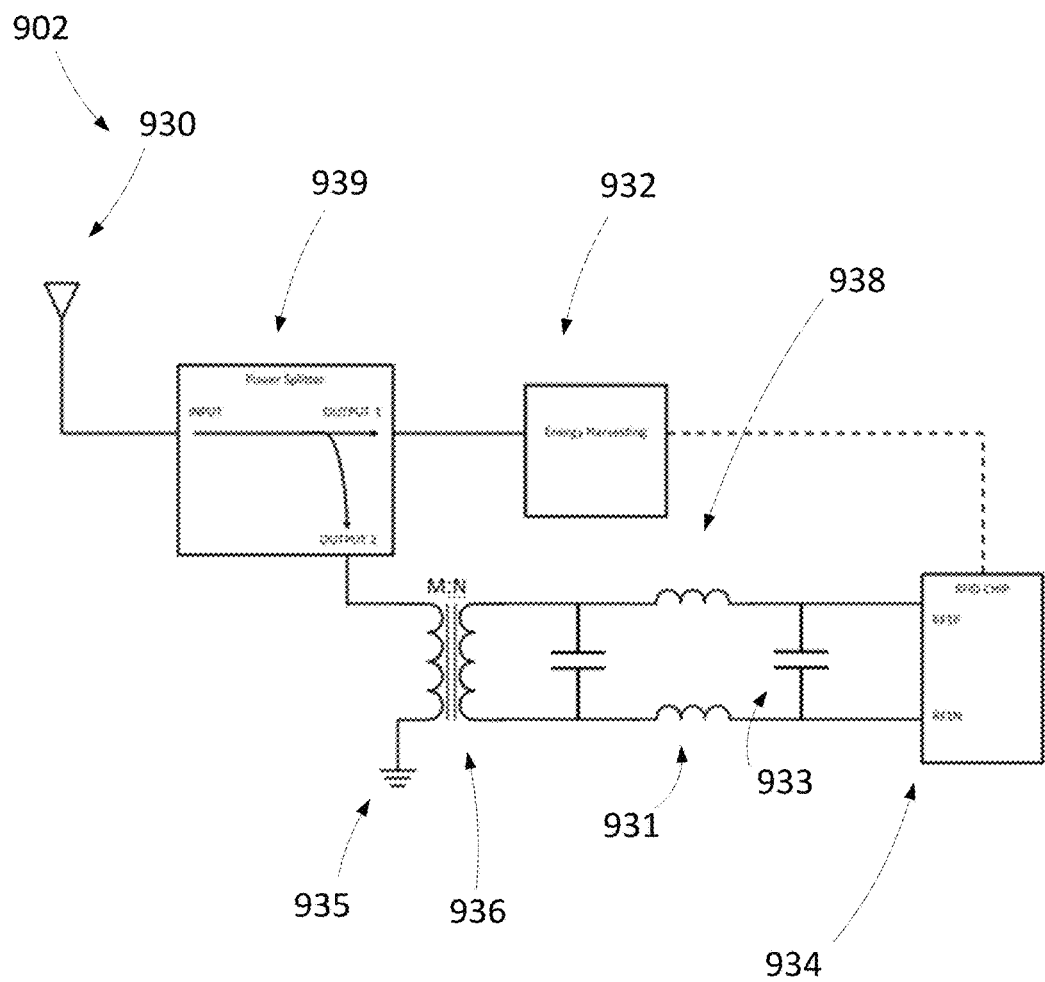
FIG. 9 is a schematic illustration of a system including an antenna, according to an embodiment.

FIG. 9 is a schematic representation of a system 902. The system 902 may be included in or coupled to any of the receivers described herein. The system 902 may include an antenna 930, a power splitter 939, an energy harvesting circuit 932 (e.g., for harvesting RF energy), a balun 936, an impedance matching network 938, an RFID chip 934, and a ground 935. The impedance matching network 938 may include, for example, capacitors 933 and inductors 931. The balun 936 may have an M:N turns ratio. As shown in FIG. 9, the power splitter 939 may be used such that the system 902 may perform both RFID and RF energy harvesting simultaneously. The power splitter 939 may have an input, a first output, and a second output. The first output may be coupled to the energy harvesting circuit 932. The second output may be coupled to the balun 936 and impedance matching network 938. The energy harvesting circuit 932 may bias and provide power to the RFID chip 934 to enhance the range and sensitivity of the RFID chip. In some implementations, the power splitter 939 may split the power such that half the power from the antenna 930 is provided to the energy harvesting circuit 932 and half the power from the antenna 930 is provided to the balun 936 and the impedance matching network 938 (and thus to the RFID chip 934). In some implementations, the power splitter 939 may split the power from the antenna 930 such that more energy (e.g., 75%) is provided to the energy harvesting circuit 932, and the rest (e.g., 25%) is provided to the balun 936 and the impedance matching network 938 (and thus to the RFID chip 934). In some implementations, the energy harvesting circuit 932 may be the same or similar to any of the RF to DC converters disclosed in U.S. Pat. No. 7,868,482, which is incorporated by reference herein in its entirety. In some implementations, the power splitter 939 may include a simple resistive tap.

Figure 10:
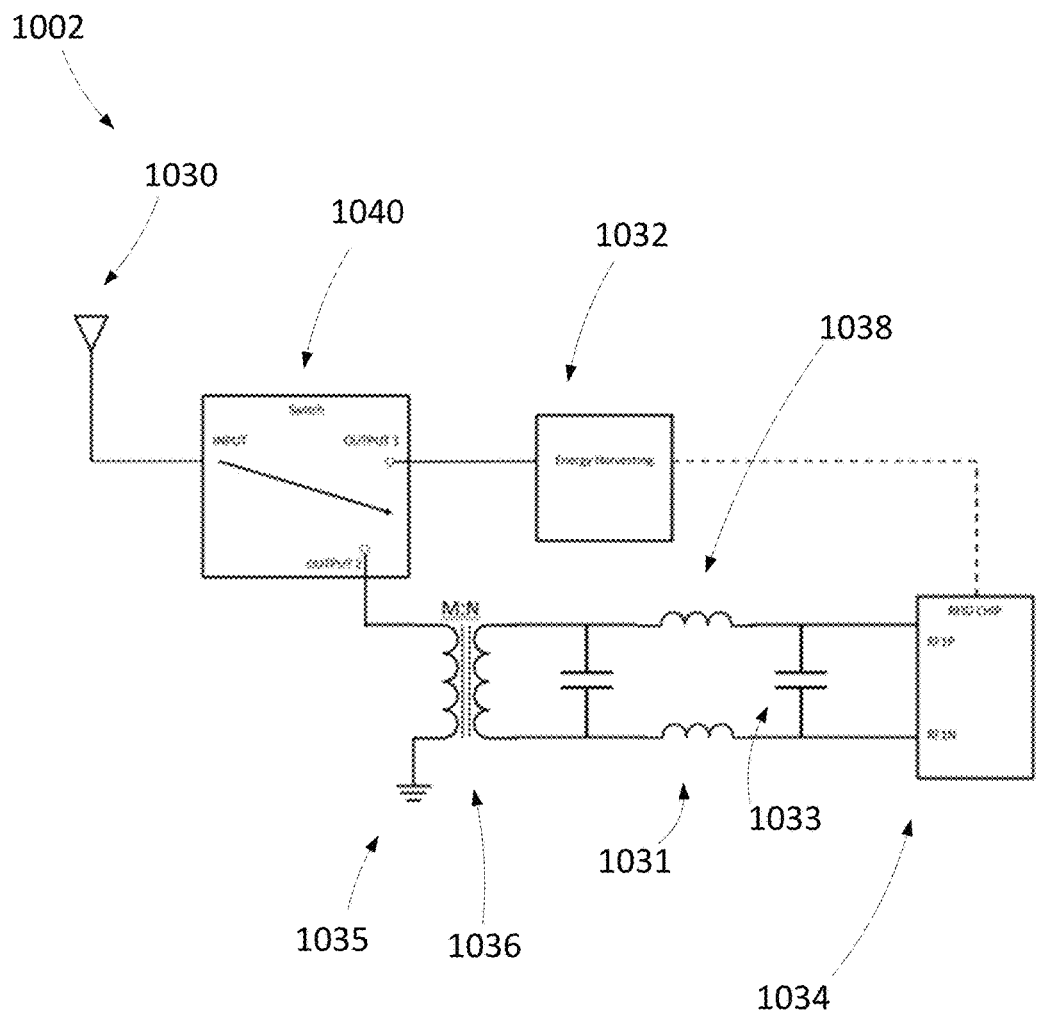
FIG. 10 is a schematic illustration of a system including an antenna, according to an embodiment.

FIG. 10 is a schematic representation of a system 1002. The system 1002 may be included in or coupled to any of the receivers described herein. The system 1002 may include an antenna 1030, a power switch 1040 (e.g., an RF power switch), an energy harvesting circuit 1032 (e.g., for harvesting RF energy), a balun 1036, an impedance matching network 1038, an RFID chip 1034, and a ground 1035. The impedance matching network 1038 may include, for example, capacitors 1033 and inductors 1031. The balun 1036 may have an M:N turns ratio. As shown in FIG. 10, the system 1002 may use the power switch 1040 and the antenna 1030 to switch between energy harvesting and RFID. The antenna 1030 may be a 50 ohm antenna. The power switch 1040 may include an input, a first output, and a second output. The first output may be coupled to the energy harvesting circuit 1032. The second output may be coupled to the balun (if required because the antenna 1030 is unbalanced) and the impedance matching network 1038. The power switch 1040 may be biased by the energy being harvested by the energy harvesting network 1032 or by some other power source such as, for example, a battery or a capacitor. In some implementations, the energy harvesting circuit 1032 may be the same or similar to any of the RF to DC converters disclosed in U.S. Pat. No. 7,868,482, reference above with respect to FIG. 9. The power switch 1040 may be normally closed. In some implementations, the energy harvesting circuit 1032 may receive power form the antenna 1030 when the power switch 1040 is in the normally closed configuration.

Figure 11:
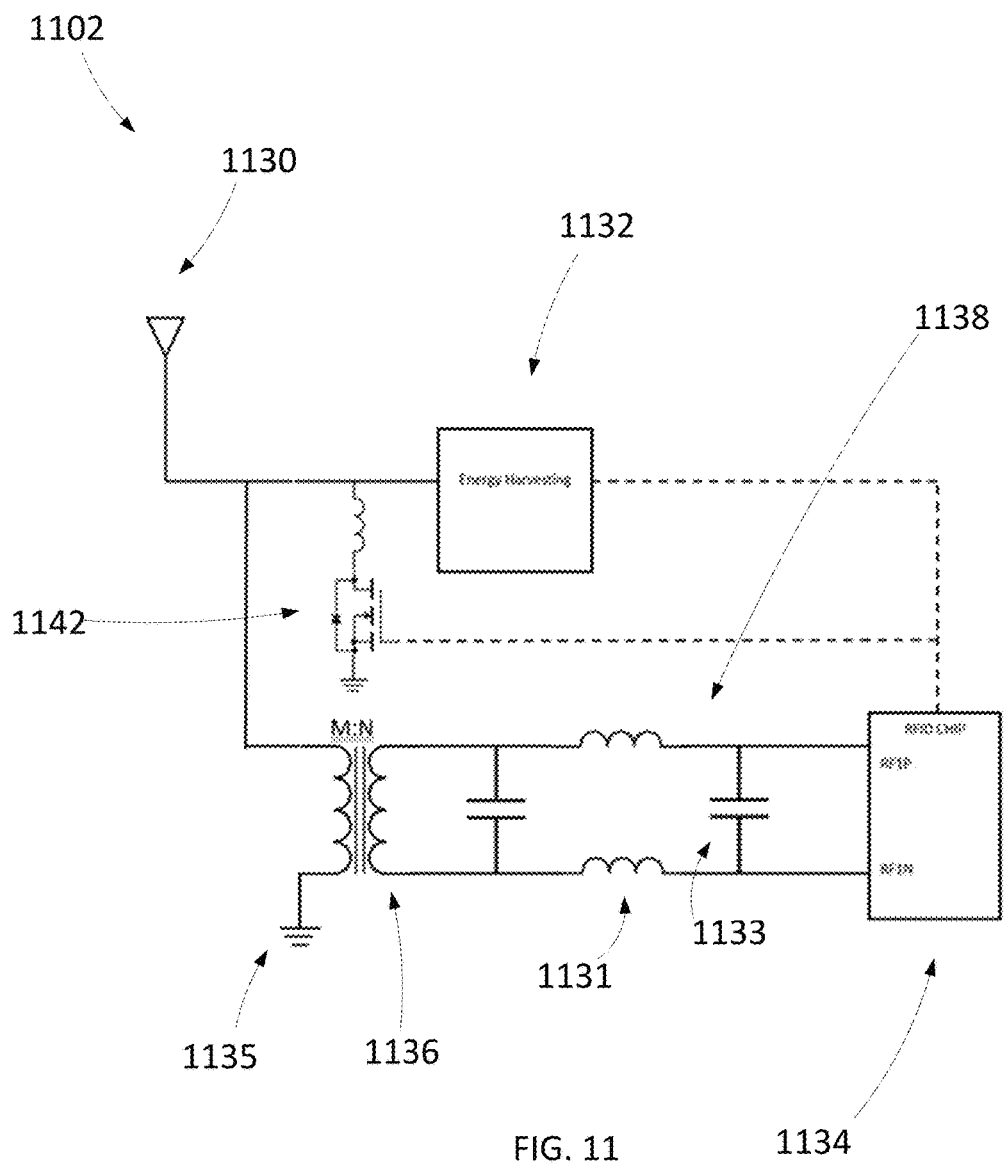
FIG. 11 is a schematic illustration of a system including an antenna, according to an embodiment.

FIG. 11 is a schematic representation of a system 1102. The system 1102 may be included in or coupled to any of the receivers described herein. The system 1102 may include an antenna 1130, a switch 1142, an energy harvesting circuit 1132 (e.g., for harvesting RF energy), a balun 1136, an impedance matching network 1138, an RFID chip 1134, and a ground 1135. The impedance matching network 1138 may include, for example, capacitors 1133 and inductors 1131. The balun 1136 may have an M:N turns ratio. The switch 1142 may include a MOSFET device or other switch configured to create a DC short to disable the energy harvesting circuit 1132 so that RF energy from the antenna 1130 may be sent to the balun 1136 and impedance matching network 1138 (and thus, to the RFID chip 1134). In some implementations, an RF choke may be disposed before the switch 1142 such that RF energy cannot pass through the RF choke to the switch 1142. The power harvested by the energy harvesting circuit 1132 may bias the switch 1142 or the switch 1142 may be biased by some other external source. Although the switch 1142 is shown as being in the location relative to the other components in FIG. 11, the switch 1142 may be arranged between the balun 1136 and the ground 1135 such that the balun 1136 is used as an RF choke. The switch 1142 may be used to modify the impedance of the energy harvesting circuit 1132 by changing the DC operating point which in turn causes the energy harvesting circuit 1132 to have a high impedance allowing RF energy to pass almost entirely to the RFID chip. In some implementations, the RFID chip always receives some portion of the RF power received by the antenna 1130 such that the RFID is always readable. The energy harvesting circuit 1132 may be used to bias the switch 1142 and provide power to the RFID chip 1134 to enhance the sensitivity of the RFID chip 1134.

In some implementations, the balun 1136 (or any of the baluns described herein) may be implemented with a transformer or a discrete or printed inductor and capacitor network. In some implementations, the balun 1136 (or any of the baluns described herein) also may not be included in the system 1102 (or any of the systems described herein) such RF energy may flow from the antenna 1130 directly to the impedance matching network 1138. The antenna 1130 (or any of the antennas described herein) may include various metals such as, for example, copper, tin, and/or aluminum. The antenna 1130 (or any of the antennas described herein) may be printed or etched. The antenna 1130 (or any of the antennas described herein) may be of any configuration or type and may be balanced or unbalanced. The systems shown and described with respect to FIGS. 6-11 may be utilized on any printed circuit board (PCB) of any material or size such as, for example, FR4, 370HR, and/or a flex PCB.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the systems (or any of its components) described herein can include a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Although various embodiments have been described as having particular features and/or combinations of components, other embodiments are possible having a combination of any features and/or components from any of the embodiments where appropriate.

The invention claimed is:

1. A system, comprising:
a transmitter having a first mode and a second mode, the transmitter configured to repeatedly send a number of discrete first wireless signals in the first mode, each wireless signal of the first wireless signals having a power level and carrying transmitter identification information uniquely associated with the transmitter, the transmitter configured, when in the second mode, to send a second wireless signal having a power level and carrying the transmitter identification information; and
a receiver configured to receive a wireless signal of the first wireless signals such that the receiver is activated by the wireless signal of the first wireless signal, the receiver configured, in response to receiving the wireless signal of the first wireless signals, to send a third wireless signal carrying the transmitter identification information to the transmitter,
the transmitter configured to transition from the first mode to the second mode in response to receiving the third wireless signal and determining that the third wireless signal includes the transmitter identification information uniquely associated with the transmitter.

2. The system of claim 1, wherein each of the first wireless signals has a first duration and the second wireless signal has a second duration longer than the first duration.

3. The system of claim 1, wherein:
when in the second mode, the transmitter remains in the second mode until a predetermined time duration of a timeout timer of the transmitter elapses, the timeout timer configured to start when the transmitter receives the third wireless signal,
the timeout timer configured to restart in response to the transmitter receiving a fourth wireless signal carrying the transmitter identification information before the predetermined time duration of the timeout timer of the transmitter elapses.

4. The system of claim 3, wherein when the transmitter transitions from the second mode to the first mode, the transmitter discontinues sending the second wireless signal if the predetermined time duration of the timeout timer elapses and the transmitter did not receive the fourth wireless signal carrying the transmitter identification information during the predetermined time duration.

5. The system of claim 1, wherein:
the first wireless signal and the second wireless signal are sent by the transmitter on a first frequency, and
the third wireless signal is sent by the receiver on a second frequency different from the first frequency.

6. The system of claim 1, wherein:
the first wireless signal and the second wireless signal are sent by the transmitter on a first frequency, and
the third wireless signal is sent by the receiver on a second frequency that corresponds to the first frequency.

7. The system of claim 1, wherein the receiver measures a received signal strength of the first wireless signal and determines the approximate distance between the receiver and the transmitter based on the received signal strength.

8. The system of claim 7, wherein the third wireless signal includes a receiver signal strength indicator representing a received signal strength of the first wireless signal.

9. The system of claim 1, wherein the third wireless signal includes receiver identification information uniquely associated with the receiver.

10. The system of claim 1, wherein the third wireless signal includes energy storage level information representing an energy storage level of an energy storage device coupled to the receiver.

11. The system of claim 4, wherein the receiver is a first receiver, the system further comprising:
a second receiver, the fourth wireless signal being sent by the second receiver.

12. The system of claim 1, wherein the receiver receives power and the transmitter identification information from the transmitter via a single antenna.

13. A system, comprising:
a receiver configured to send a first wireless signal to a transmitter, the first wireless signal including a request for power, the receiver configured, upon receiving a second signal including transmitter identification information, to send a third wireless signal including the transmitter identification information; and
a transmitter configured to activate in response to receiving the first wireless signal such that the transmitter sends a second wireless signal having a power level and carrying transmitter identification information uniquely associated with the transmitter, the transmitter configured to send the second wireless signal until a predetermined time duration of a timeout timer of the transmitter elapses, the timeout timer configured to start when the transmitter receives the first wireless signal, the timeout timer configured to restart upon the transmitter receiving the third wireless signal carrying the transmitter identification information.

14. The system of claim 13, wherein the transmitter is configured to determine a distance between the transmitter and the receiver.

15. The system of claim 14, wherein the transmitter is configured to determine the distance between the transmitter and the receiver based on a received signal strength of the first wireless signal.

16. The system of claim 14, wherein the transmitter is configured to activate in response to receiving the first wireless signal only if the distance between the transmitter and the receiver is below a threshold distance.

17. A method, comprising:
sending, by a receiver at a first time, a first wireless signal including a request for power;
receiving, by a transmitter, the first wireless signal;
sending, by the transmitter at a second time after the first time, a second wireless signal having a power level and carrying transmitter identification information, the transmitter continuing to send the second wireless signal until a timeout timer of the transmitter reaches a predetermined time threshold;
receiving, by the receiver, the second wireless signal such that at least one of the receiver is powered by the second wireless signal or an energy storage level of an energy storage device coupled to the receiver is increased; and
sending, by the receiver at a third time after the second time, in response to receiving the second wireless signal from the transmitter, a third wireless signal including the transmitter identification information repetitively, the timeout timer of the transmitter being reset upon receiving the third wireless signal.

18. The method of claim 17, further comprising, prior to sending the first wireless signal by the receiver at the first time, sending, by the transmitter, a fourth wireless signal having a power level and carrying the transmitter identification information, the first wireless signal including the transmitter identification information.

19. The method of claim 17, further comprising, determining, by the receiver, a distance between the receiver and the transmitter, wherein the third wireless signal is only sent by the receiver if the distance is below a threshold distance.

20. The method of claim 18, further comprising, determining, by the transmitter, a distance between the receiver and the transmitter, wherein the second wireless signal is only sent by the transmitter if the distance is below a threshold distance.

21. The method of claim 19, wherein the receiver is a first receiver, further comprising:
receiving, by a second receiver, the second wireless signal such that at least one of the second receiver is powered by the second wireless signal or an energy storage level of an energy storage device coupled to the second receiver is increased;
sending, by the second receiver, in response to receiving the second wireless signal from the transmitter, a fourth wireless signal including the transmitter identification information repetitively, the timeout timer of the transmitter being reset to zero upon receiving the fourth wireless signal.

* * * * *